United States Patent
Joshi et al.

(10) Patent No.: US 11,361,086 B2
(45) Date of Patent: Jun. 14, 2022

(54) RELIABLE DATACENTER PROTECTION AT SCALE

(71) Applicant: Microsoft Technology Licensing, LLC, Redmond, WA (US)

(72) Inventors: Piyush Joshi, Redmond, WA (US); Akil M. Merchant, Kirland, WA (US); Octavian T. Ureche, Bellevue, WA (US); Jack Smith Richins, Bothell, WA (US); Soumya D. Pani, Bothell, WA (US); Asad Yaqoob, Redmond, WA (US); Salil Bhagurkar, Redmond, WA (US); Preston Derek Adam, Redmond, WA (US); Dayi Zhou, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 192 days.

(21) Appl. No.: 16/729,883

(22) Filed: Dec. 30, 2019

(65) Prior Publication Data
US 2021/0200881 A1 Jul. 1, 2021

(51) Int. Cl.
*G06F 21/60* (2013.01)
*H04L 9/40* (2022.01)

(52) U.S. Cl.
CPC ........ *G06F 21/602* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 2010/0333116 A1* | 12/2010 | Prahlad | G06F 16/41 |
| | | | 719/328 |
| 2017/0006064 A1* | 1/2017 | Agarwal | H04L 63/10 |
| 2019/0005262 A1 | 1/2019 | Surla et al. | |
| 2019/0081990 A1 | 3/2019 | Roy et al. | |
| 2019/0319785 A1 | 10/2019 | Kumar et al. | |

OTHER PUBLICATIONS

"International Search Report and Written Opinion Issued in PCT Application No. PCT/US20/058997", dated Feb. 17, 2021, 11 Pages.

* cited by examiner

*Primary Examiner* — Brandon Hoffman
(74) *Attorney, Agent, or Firm* — Workman Nydegger

(57) ABSTRACT

Methods and systems are disclosed for activating data encryption at rest in a storage device server in a cloud storage. In particular, an encryption orchestrator orchestrates activation processes through encryption controllers that controls policies and privileges to access data in storage device servers. To reduce a risk of a data loss and time loss in activations, the encryption controller pre-checks a storage device server for anomalies in configurations in network connectivity, encryption keys, and security certificates before starting the activation. Furthermore, the encryption controller performs a health-check of the storage device servers to detect anomalies that require restarting the storage device servers. The health-check reduces a risk of data loss when the storage device servers become unable restart itself. User interface tools may be provided to visually identify and manage encryption statuses and policies of the encryption controllers, the storage device servers, and data storage devices.

20 Claims, 15 Drawing Sheets

500

| Encryption Controller ID: ABC 501 | | | | | |
|---|---|---|---|---|---|
| SERVER ID 502 | STORAGE ID 504 | CERTIFICATE 506 | KEY 508 | ENCRYPTION POLICY 510 | STATUS 512 |
| 00001 | 00001 | 12345678 | 201910011801 | Host OS-Type-A | ENCRYPTED |
| 00001 | 00002 | 12345601 | 201910011802 | Host OS-Type-A | ENCRYPTED |
| 00001 | 00003 | 12345602 | 201910011803 | Host OS-Type-A | ACTIVATING... |
| 00001 | 00004 | 12345603 | 201910011804 | Host OS-Type-A | ENCRYPTED |
| 00001 | 00005 | 12345604 | 201910011805 | Host OS-Type-A | ENCRYPTED |
| 00001 | 00006 | 12345605 | 201910011806 | Host OS-Type-A | ERROR |
| 00002 | 00001 | NONE | NONE | Host OS-Type-B | ENCRYPTED |
| 00002 | 00002 | 12345607 | 201910011808 | DISK-HARDWARE | ENCRYPTED |
| 00002 | 00003 | 12345608 | 201910011809 | Host OS-Type-B | ENCRYPTED |
| 00002 | 00004 | 12345609 | 201910011810 | Host OS-Type-B | ENCRYPTED |
| 00003 | 00001 | 12345610 | LOCAL | Host OS-Type-C | UNENCRYPPTED |
| 00003 | 00002 | 12345611 | LOCAL | Host OS-Type-C | ERROR |
| 00004 | 00001 | 12345612 | LOCAL | Host OS-Type-C | ENCRYPTED |
| 00004 | 00002 | 12345614 | LOCAL | Host OS-Type-C | ENCRYPTED |
| 00101 | 00001 | 12345615 | 201910011811 | Host OS-Type-A | ENCRYPTED |
| 00101 | 00002 | 12345616 | 201910011812 | Host OS-Type-A | ENCRYPTED |

FIG. 5

RELIABLE DATACENTER PROTECTION AT SCALE

BACKGROUND

As data breaches have become increasingly more common, the demand for data encryption at rest has increased. This is particularly true for cloud storage data services as more users and enterprises move their data from local storage to the cloud.

Data encryption at rest generally relates to encrypting data that is stored in storage device servers, data storage devices, and/or on data drives that are attached to the storage device servers. In combination with encrypting data in motion or data that is actively transmitted over the network (e.g., virtual private networks), encrypting data at rest enhances data security by protecting data while the data rests in storage devices, whether locally or in the "cloud".

Tools for managing encryption of data at rest provide for activation and deactivation of an encryption feature by specifying a storage device (e.g., server, drive, or blade) that is attached to the storage device server. In some aspects, such tools are executed on the server. Once activated, data on the data storage drive is encrypted, thereby providing encryption of data at rest. In some cases, a host operating system of the storage device server processes data encryption and decryption. In other cases, a hardware processor on the data storage drive (e.g., hard disks and memory) processes the encryption and decryption. Activating and deactivating the encryption feature may require restarting or rebooting the storage device server and/or the drive. When an error occurs during the restart or reboot of the storage device server and/or the data storage drive, some or all of data may become unrecoverable. Further, the encryption activation operation on the storage device server and/or the data storage drive may be time-consuming, particularly if all the existing data on the data storage drive needs to be encrypted. When an error is found during activation operations, the activation operation may need to be restarted.

These problems are compounded in a cloud storage system, which may include tens of thousands of data storage drives attached to hundreds of servers. Indeed, a cloud storage system may include more than a million blades of servers in distributed geographical locations. In some aspects, all the legacy data storage drives without encryption of data at rest in the cloud storage system may need to be converted into supporting the encryption of data at rest.

The tools for managing encryption of data at rest need to be improved for use in the cloud storage system. Among the problems is that data may be not available during the encryption activation and deactivation operations on one or more storage device servers and/or data storage drives. This is particularly a problem for cloud storage systems because users typically expect and require high availability. As such, it becomes critically important to minimize occurrence of rebooting of the storage device servers and the associated risk of data loss in cloud storage systems. Another problem is that the data service may not be reliable during encryption activation and deactivation operations, particularly as cloud storage systems get larger and larger. For example, an error in rebooting of the storage device servers while applying software updates or patches may result in loss of data. Further, scalability of management policies and coordination of the encryption activation and deactivation operations becomes problematic over thousands of data storage drives.

One way to solve these problems is to perform encryption activation and deactivation of encryption manually, storage device by storage device. But this is time consuming and nearly impossible in large cloud storage networks. Thus, there is a need to improve reliability of automated activation of encryption of data at rest over groups of data storage drives in the cloud storage systems.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by pre-checking data storage devices, activating encryption of data at rest in the data storage devices when the pre-check passes, and monitoring a health status and configuration of the data storage devices after encryption (e.g., a health check).

The issues of providing reliable data encryption at rest in the cloud environment may be addressed by centrally orchestrating a task of encrypting data in storage device servers and data storage devices. The orchestration may reduce failures while activating data encryption at rest on the storage device servers and the data storage devices by performing pre-check. The orchestration may also reduce failures while the storage device servers and the data storage devices are actively in operation based on encryption of data at rest by performing health check of the storage device servers and the data storage devices. In particular, the orchestration may include steps of pre-checking a status of a storage device server to be encrypted, activating data encryption for the storage device server when the pre-check passes, and monitoring the integrity of the storage device server and its configuration data after activating data encryption at rest in the storage device server. Data used by the pre-checks and health checks of the storage devices may include, but are not limited to, network configuration data, encryption and decryption keys, assigned security certificates, and a status of a hardware-based encryption processor of the storage device (if equipped).

A graphical user interface (GUI) provides display and change configurations of storage devices and servers in the cloud. The GUI may provide controls to adjust various parameters of activating and deactivating data encryption at rest among the storage device or the data drives.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 5 illustrates data structures with which the disclosure may be practiced of the present disclosure.

DETAILED DESCRIPTION

Figure 1:
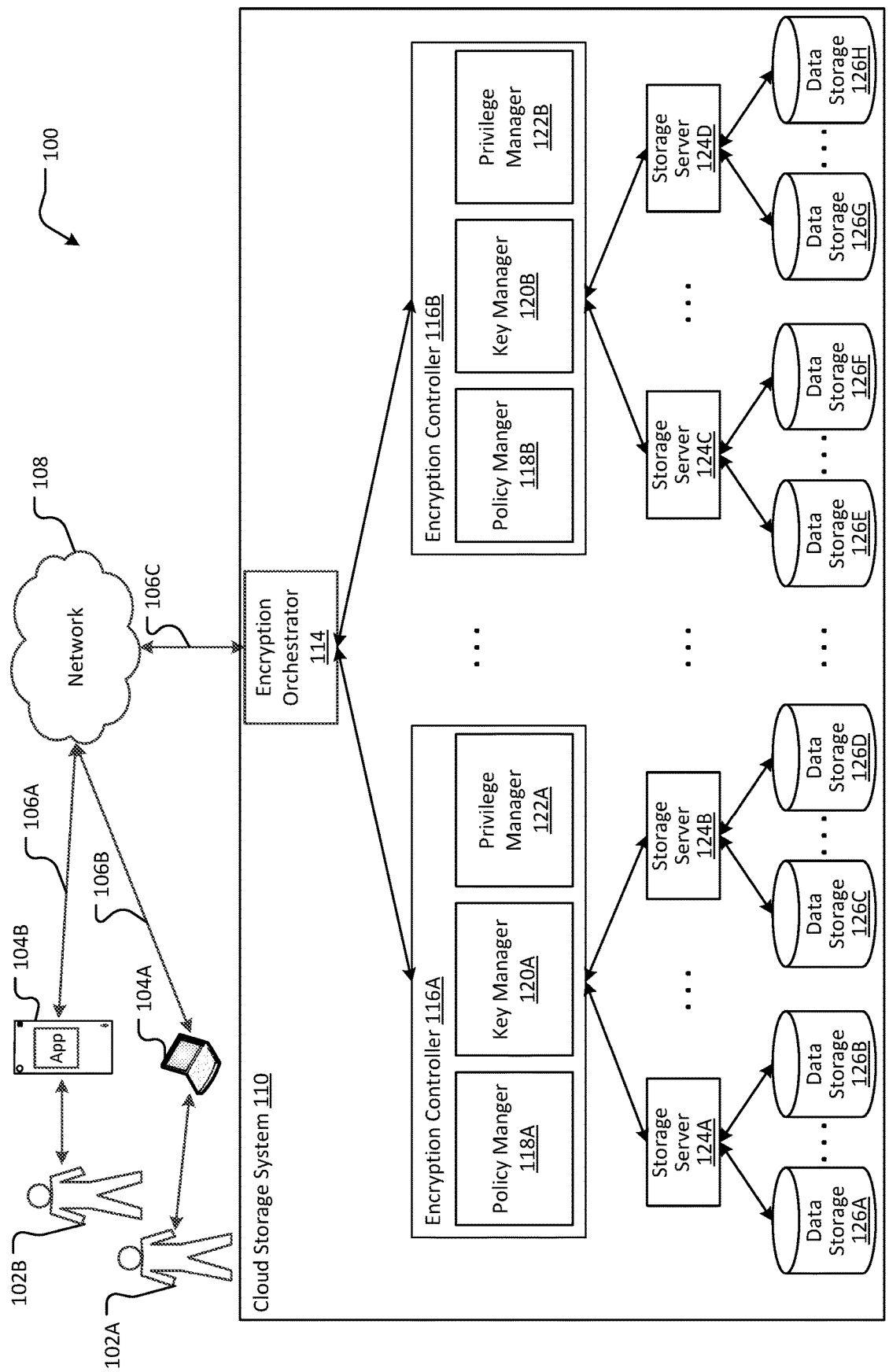
FIG. 1 illustrates an overview of an example system for an encryption orchestrator system of the present disclosure.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein. Rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for providing reliable datacenter protection at scale based on data encryption at rest in a cloud. "Defense in Depth" is an approach to cybersecurity by providing multiple layers and data protection functions in collective manner. Protecting data while the data is stored in data storage devices has become an essential part of the Defense in Depth. Providing data encryption at rest is effective in case of malicious removal or improper handling of these disks. While encryption of data at rest has become widely used by data servers, the encryption of data at rest over thousands of virtual disks and storage device servers in a cloud storage system has become critically important as customers expect high levels of security, availability, and performance from the cloud storage system. One aspect of providing this Defense in Depth by the cloud storage system is to provide an infrastructure-based data encryption, ensuring the data stored in the physical disks are encrypted at rest, for example. To operate on the infrastructure layer encryption reliably at the scale of large cloud providers, the cloud storage system needs to manage encryption at rest for each of the data storage devices efficiently and reliably.

As cloud storage systems have become widely used, it has become important for the cloud storage systems to ensure data is protected at rest. Such a data protection covers not only over a million of server blades in the data centers but also customer data in virtual machines. However, encrypting all data is a time-consuming process, particularly when the existing cloud storage devices do not yet to support encryption of data at rest. Among the challenges has been an issue that relates to reduced reliability of the data service when data storage device servers have data recovery events in the case of data loss. Furthermore, there are issues of potential data loss in the event of failure among the storage device servers upon their starting, running and shutting down. In some aspects, checking for possible status of the storage device servers and the data storage drives to identify anomalies such as a mismatch in encryption/decryption keys and network connectivity may prevent possible events that cause data recovery events from occurring. A pre-check mode or agent may perform a check prior to activating data encryption to identify conditions that would cause a data recovery event. In some aspects, the pre-check mode may be launched automatically or programmatically without committing the start of the encryption operation. The pre-check mode may test prerequisites for successfully activating data encryption at rest upon a storage device server and a data storage drive.

Furthermore, a health-check mode or agent may periodically check network configurations, and server configurations, data encryption/decryption keys and certificates when the data encryption at rest is active. A high risk of data loss may relate to a reboot of the storage device servers the data storage drives. The health-check may detect anomalies before applying security and other software patches and updates that may cause rebooting/restarting the storage device servers.

FIG. 1 illustrates an overview of an example system 100 of the present disclosure. System 100 may include one or more client computing devices 104 (e.g., client computing devices 104A and 104B) that may execute an application (e.g., a web search service application, a natural language voice recognition application, a file browser, etc.). The one or more client computing devices 104 may be used by users 102 (e.g., users 102A and 102B). The users 102 may be customers of a cloud storage service. The application is of any type that can accommodate user operations that are recorded. The client devices 104A and 104B connect to the network 108 via respective links 106A and 106B. A cloud storage system 110 provides a set of data storage devices as a cloud to the client computing devices 104 via the network 108. In some aspects, the cloud storage system is located in one or more datacenters. The cloud storage system 110 may connect to the network via a link 106C. The cloud storage system 110 may include data encryption at rest, where data as stored in respective storage devices in the cloud is encrypted. The cloud storage system 110 may include thousands of data storage devices 126 (e.g., data storage devices 126A-H), connected in groups to respective storage device servers 124 (e.g., storage device servers 124A-D).

As illustrated by FIG. 1, in examples, the cloud storage system 110 includes at least one server version of an encryption orchestrator 114. The encryption orchestrator 114 orchestrates management of encrypting data in data storage devices 126, storage device servers 124, and encryption controllers 116 in the cloud storage system 110. The encryption orchestrator 114 connects to one or more encryption controllers 116 (e.g., encryption controllers 116A and 116B).

The one or more encryption controllers 116 includes a policy manager 118 (e.g., policy managers 118A and 118B), a key manager 120 (e.g., key managers 120A and 120B) and a privilege manager (e.g., privilege managers 122A and 122B).

The server version of an encryption orchestrator 114 may also be implemented in a distributed environment across the network 108. Moreover, as should be appreciated, either a client or a server version of the encryption orchestrator 114 may be capable of receiving commands from users (e.g., user 102A or 102B) to configure and manage data encryption at rest in the cloud storage system 110. While a server version of the encryption orchestrator 114 is shown and described, this should not be understood as limiting. Rather, a client version of the encryption orchestrator 114 may similarly implement the encryption orchestrator 114 on a client computing device 104A, 104B to remotely manage the cloud storage system 110.

In at least some aspects, the one or more client computing devices 104 (e.g., 104A and 104B) may be personal or handheld computers operated by one or more users 102 (e.g., a user 102A and another user 102B). For example, the one or more client computing devices 104 may include one or more of: a mobile telephone, a smart phone, a tablet, a phablet, a smart watch, a wearable computer, a personal computer, a desktop computer, a laptop computer, a gaming device/computer (e.g., Xbox®), a television, and the like. This list is exemplary only and should not be considered as limiting. Any suitable client computing device for executing the usage classifier application 114 may be utilized.

In at least some aspects, network 108 is a computer network such as an enterprise intranet, an enterprise extranet and/or the Internet. In this regard, the network 108 may include a Local Area Network (LAN), a Wide Area Network (WAN), the Internet, wireless and wired transmission mediums. In further aspects, server computing device 112 and other server computing devices 110A and 110B may communicate with some components of the system via respective links 106A-E to a local network (e.g., an enterprise intranet), whereas server computing device 112 may communicate with other components of the system via a wide area network (e.g., the Internet). In addition, the aspects and functionalities described herein may operate over distributed networks (e.g., cloud computing systems), where application functionality, memory, data storage device and retrieval, and various processing functions may be operated remotely from each other over a distributed computing network, such as the Internet or an intranet.

As described above, the encryption orchestrator 114 may be implemented in the cloud storage system 110 to orchestrate encryption and decryption of data at rest in the data storage devices 126 in the cloud storage system 110. In a basic configuration, the encryption orchestrator 114 connects to one or more encryption controllers 116 (e.g., encryption controllers 116A and 116B). The encryption orchestrator 114 may connect to hundreds of encryption controllers 116, for example. Each of the encryption controllers 116 may connect to one or more storage device servers 124. For example, the encryption controller 116A may connect to storage device servers 124A and 124B. In some aspects, the encryption controller 116A may connect thousands of storage device servers 124. In some other aspects, the encryption controller 116A may connect with hundreds of racks of servers, where each rack may include over sixty storage servers 124 in the form of blades, for example. Each of the storage device servers 124 may connect to one or more data storage devices 126 (e.g., data storage devices 126A-H). For example, the storage device server 124A may connect to data storage devices 126A and 126B. In some aspects each of the storage device servers 124 may connect to hundreds or thousands of the data storage devices 126. In some aspects, the encryption orchestrator 114 may enable deciding which storage device servers to activate and deactivate encryption, set various policies including, but not limited to, types of data encryption to all policy managers (e.g., policy managers 118A and 118B).

In some aspects the storage device servers 124 may encrypt and decrypt data in data storage devices 126 based on host operating systems of the respective storage device servers 124. Different host operating systems may provide encryption functionality that is specific to the respective host operating systems. In some other aspects, the storage device servers 124 may encrypt and decrypt data in data storage devices 126 based on hardware-based data encryption functionality that respective data storage devices 126 may provide. Such hardware-based data encryption functionality may use data processors in the data storage devices 126. The data storage devices 126 may include data drive devices. In some other aspects, the data storage devices 126 may be implemented as virtual data disk drives where there may be multiple virtual data disk drives in a data storage device. There may also be a virtual data storage device across multiple data storage devices (e.g., the data storage devices 126A and 126B).

In some aspects, the encryption controller 116A may include a policy manager 118A, a key manager 120A, and privilege manager 122A, collectively controlling encryption of data at rest in respective data storage devices 126A-D connected to the storage device servers 124A-B. The key manager 120A manages security keys used to encrypt and decrypt data stored in the data storage devices 126A-D. In some aspects, the key manager 120A also manages security certificates for authenticating and for accessing the data storage devices 126A-D through the storage device server 124A. Similarly, the key manager 120B manages keys for data encryption and decryption in the data storage devices 126E-H. In some aspects, the key manager 120B also manages security certificates for authenticating and for accessing the data storage devices 126E-H through the storage device server 124B. The policy manager 118A manages policies for processing data encryption at rest in the data stores 126A-D. Policies may include, but are not limited to activating data encryption at rest by specifying a data storage device (e.g., the data storage device 126A) and deactivating data encryption at rest by specifying the data storage device. In some aspects, the cloud storage system 110 may use the policies to address the issue of reliably managing data at rest in the cloud storage system in the scalable and robust manner. The policy manager 118A receives requests for a command based on a policy, such as an activation command to encrypt a data storage device, for example, from the encryption orchestrator 114. The policy manager 118A provides an update and a response to the encryption orchestrator 114 based on a result of executing the command based on the policy. The privilege manager 122A manages privilege settings for accessing the data storage devices 126A-D through storage device servers 124A-B. The privilege settings may include but are not limited to access credentials to access storage device servers 124 and data storage devices 126. In some aspects, the privilege settings may be specific to particular host operating systems of the storage device servers 124 and data storage devices 126.

In some aspects, the encryption orchestrator 114 may provide graphical user interface tool for cloud storage system administrators to view, activate, and initiate other operations upon respective encryption controllers 116 (e.g., the encryption controllers 116A and 116B) and storage device servers 124 and data storage devices 126. For example, the tool polls an operating status of encryption controllers 116, policies and keys set in respective encryption controllers 116, network property values, health-check statuses of the storage device servers 124, and encryption and other statuses of respective data storage devices 126. In response to the polling request from the tool at the encryption orchestrator 114, the respective encryption controllers 116 may provide the operating status. In some other aspects, the encryption controllers 116 may periodically push the operation status to the encryption orchestrator 114 to automatically update the respective operation status in the tool.

As should be appreciated, the various methods, devices, applications, features, etc., described with respect to FIG. 1 are not intended to limit the system 100 to being performed by the particular applications and features described. Accordingly, additional topology configurations may be used to practice the methods and systems herein and/or features and applications described may be excluded without departing from the methods and systems disclosed herein.

Figure 2:
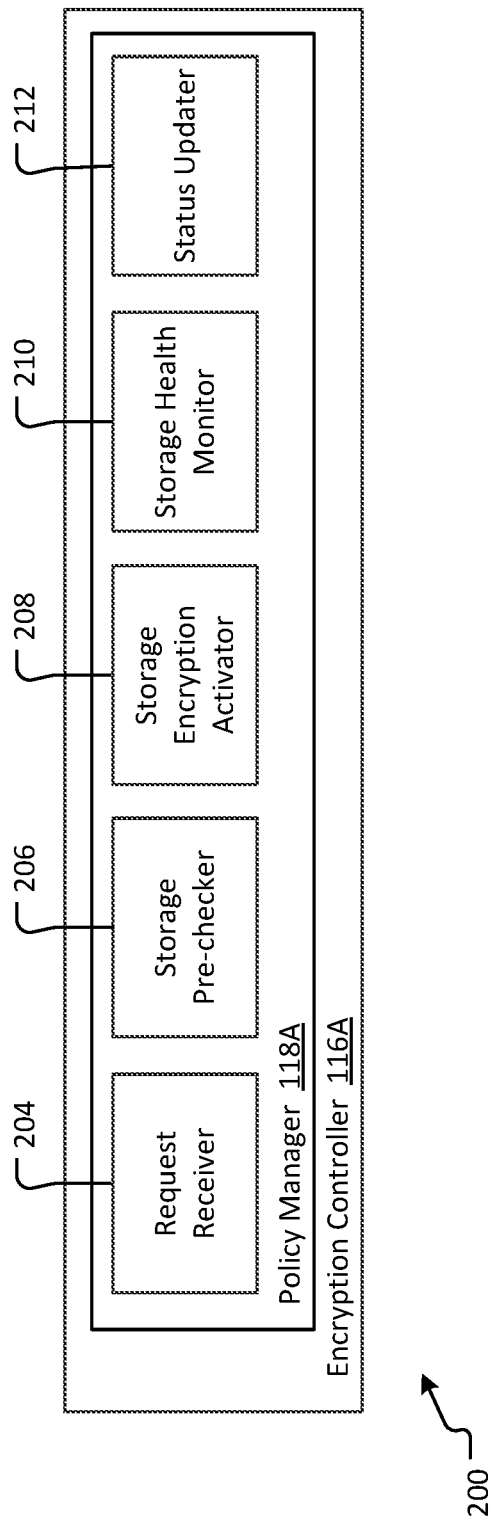
FIG. 2 illustrates an exemplary diagram of an encryption controller of the present disclosure.

FIG. 2 illustrates an exemplary diagram of an encryption controller 116A, 116B of the present disclosure. In at least some aspects the data encryption system 200 includes the encryption controller 116A. In some aspects, the encryption controller 116A includes the policy manager 118A. The policy manager 118A includes at least a request receiver 204, a storage device pre-checker 206, a storage device encryption activator 208, a storage device health monitor 210, and a status updater 212. The policy manager 118A includes a set of policies to manage data encryption at rest among data storage devices in the cloud storage system 110. The set of policies include types of data encryption at rest in storage device servers 124, whether key management is centralized at the key manager 118 or distributed to respective storage servers 124, for example.

The request receiver 204 receives a request to activate data encryption at rest in data storage devices (126A-H). The request receiver 204 receives the request from the encryption orchestrator 114 based on user input by an operator of the cloud storage system 110 through graphical user interface, for example. The request may include as its data structure, a command, to activate data encryption at rest, for example, and one or more identifiers of target data storage devices to activate data encryption at rest.

The storage device pre-checker 206 pre-checks a status of a data storage device (e.g., the data storage devices 126A-H as specified by the request), in response to receiving the request to activate data encryption. In some aspects, the pre-check includes requesting configuration data and an operational status of specific data storage devices 126A-H. Types of status data used for the pre-check may include, but are not limited to, a network address of the storage device server 124 (e.g., the storage device server 124A) and the corresponding encryption controller 116 (e.g., the encryption controller 116A), network connectivity between the storage device server 124 and the corresponding encryption controller 116, configuration parameters of the data storage device or a disk drive, a path name, a history of hardware and software issues at the data storage device, integrity of encryption and decryption keys managed by the key managers 120, a security certificate of the specified data storage devices, data transmission speed and latency over the network in accessing the specified data storage devices, and integrity of settings of access privileges. In some aspects, the types of status data used for the pre-check relates to pre-requisites for the activation operation to succeed. The storage device pre-checker 206 may obtain the status data by requesting and receiving the data from the respective encryption controllers 116 and storage device servers 124. Pre-checking data storage devices before activating encryption of data at rest in the data storage devices reduces the possibility that the activation of encryption will fail in a subsequent step. In some aspects, the pre-check is effective to prevent loss of data because failure of encryption activation may cause unrecoverable loss of data.

The storage device encryption activator 208 activates data encryption at rest in the data storage devices as specified by the request. For example, the storage device encryption activator 208 may communicate with the encryption controllers 116 and request activation the data encryption for data in one or more specific data storage devices 126A-H. After activating the storage device encryption, data in the designated data storage device is encrypted.

The storage device health monitor 210 monitors a status of specified storage device servers and data storage devices after the encryption of data at rest in the specified storage device servers and after data storage devices becomes active. In some aspects, monitoring of storage device status may include one-time verification of parameters that are associated with the specified storage device servers and the data storage devices. Such parameters may include, but are not limited to, a network address of the storage device server 124 (e.g., the storage device server 124A) and the corresponding encryption controller 116 (e.g., the encryption controller 116A), network connectivity between the storage device server 124 and the corresponding encryption controller 116, configuration parameters of the data storage device or a disk drive, a path name, a history of hardware and software issues at the data storage device, integrity of encryption and decryption keys managed by the key managers 120, a security certificate of the specified data storage devices, data transmission speed and latency over the network in accessing the specified data storage devices, and integrity of settings of access privileges. In some aspects, the parameters used for the health-check relate to pre-requisites for the reboot operation of the storage device server with the activated encryption of data at rest to succeed when a reboot or restart of the storage device server or the data storage device takes place. The parameters may be obtained from devices associated with the specified data storage devices, the storage server that the specified data storage devices attach to, a key manager (e.g., key managers 120A-B), and a privilege manager (e.g., privilege managers 122A-B). In particular, checking integrity of the encryption and decryption keys as managed by the key manager 120 is important because there is a high likelihood of causing a failure of rebooting/restarting the storage device server 124 and the data storage 126 when the encryption and decryption keys are corrupted. Reboot or restarting the storage device server 124 may occur at various instance including applying a software patch update to the storage device server 124. When the reboot or restart of the storage device server 124 fails, the encrypted data in the storage device server 124 may become unrecoverable. In some other aspects, the storage device health monitor 210 may check the parameters periodically or as triggered by events such as data access or idle timeouts in accessing the data storage device. The storage device health monitor 210 may issue alerts and notifications to the encryption orchestrator 114 through a graphical user interface tool.

The statue updater 212 updates a status of the specified data storage devices through means such as, but are not limited to, a graphical user interface tool and message transmissions to the encryption orchestrator 114. In some aspects, the status updater 212 may update the status on the graphical user interface tool for the encryption orchestrator 114. For example, the graphical user interface tool may interactively provide a hierarchical structure of storage device servers 124 and data storage devices 126 and status information about respective data storage devices. In some aspects, the encryption orchestrator 114 receives the latest status of respective encryption controllers 116 through polling. In other aspects, the encryption controllers 116 push respective status information to the encryption orchestrator.

As should be appreciated, the various methods, devices, applications and features, etc., described with respect to FIG. 2 is not intended to limit example of the information search system 200. For example, in aspects the encryption orchestrator may also include at least a request receiver 204, a storage device pre-checker 206, a storage device encryption activator 208, a storage device health monitor 210, and a status updater 212. Accordingly, additional topology configurations may be used to practice the methods and systems herein described may be excluded without departing from the methods and systems disclosed herein.

Figure 3:
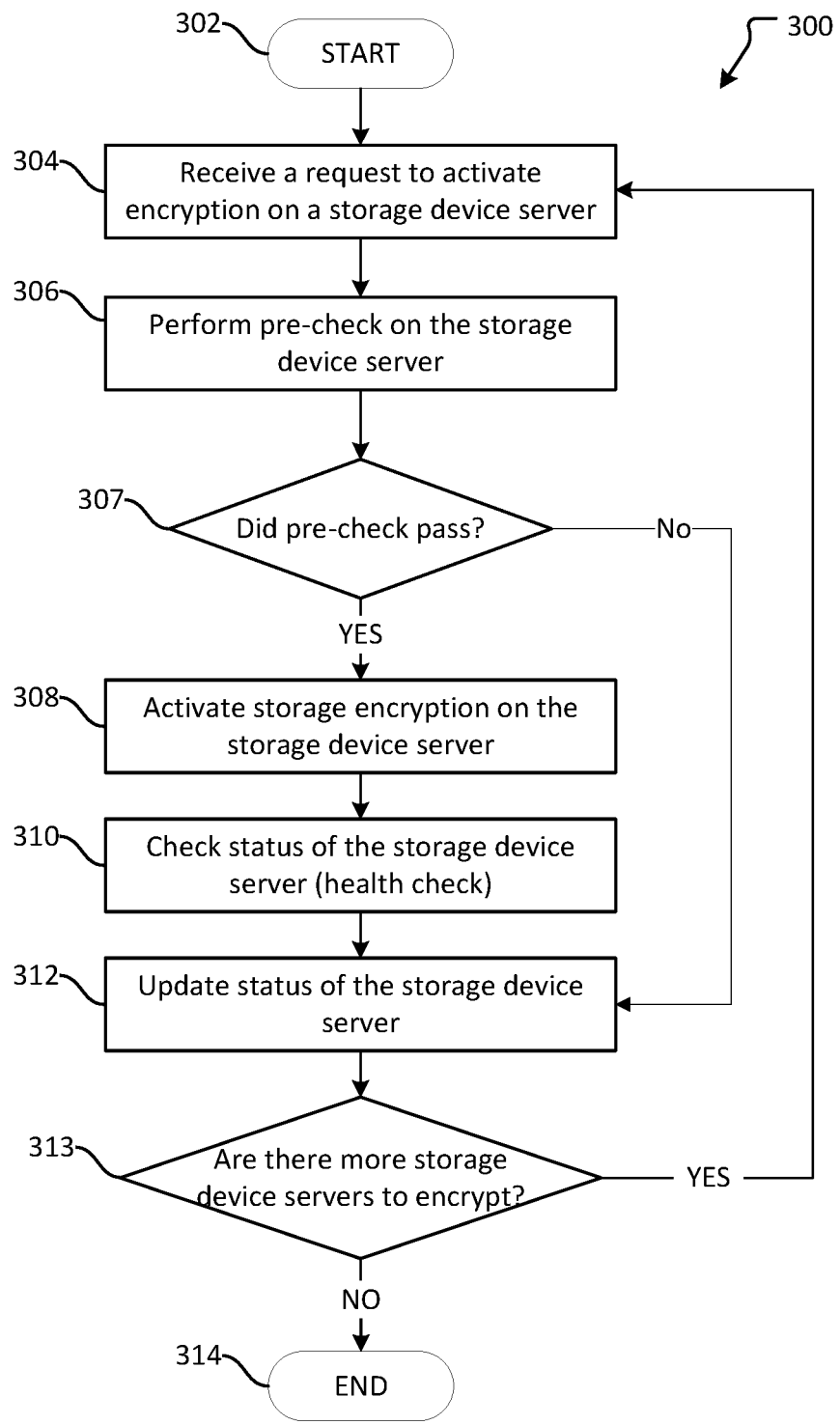
FIG. 3 illustrates an example of a method of encrypting data at rest according to an example system of the present disclosure.

FIG. 3 illustrates an example of a method of encrypting data at rest according to an example system of the present disclosure. A general order for the operations of the method 300 is shown in FIG. 3. Generally, the method 300 starts with a start operation 302 and ends with an end operation 314. The method 300 can include more or fewer stages or can arrange the order of the stages differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, a FPGA, a SOC, or other hardware device. Hereinafter, the method 300 shall be explained with reference to the systems, component, devices, modules, software, data structures, data characteristic representations, signaling diagrams, methods, etc. described in conjunction with FIGS. 1-2 and 4-11.

The receive operation 304 receives a request to activate encryption of data at rest in a storage device server. The request may specify activating encryption of data at rest in one or more data storage devices connected to respective storage device servers. In some aspects, the receive operation 302 receives the request as a result of user interaction with an encryption orchestrator tool within a graphical user interface. A user of the tool may select a storage device server and issue a command to activate encryption of data at rest for the storage device server. By successfully activating the encryption of data at rest, data written to the storage device server is encrypted.

The perform operation 306 performs a pre-check on the specified storage device server. Types of status data used for performing the pre-check operation may include, but are not limited to, network addresses, network communication performance data, connectivity between the storage device server and the key manager 120 in the encryption controller 116, and keys for data encryption and decryption for data in the specific data storage devices 126A-H. The storage device pre-checker 206 may obtain the status data by requesting for and receiving the data from the respective encryption controllers 116 and storage device servers 124. Performing the pre-check on the specified data storage devices before activating encryption reduces the possibility that an activation will fail in a subsequent step. In some aspects, performing the pre-check before activating data encryption at the storage device server is effective at both reducing processing time for the activation and preventing loss of data.

The compare operation 307 compares whether a result of the pre-check indicates a pass (e.g., successful or OK). When the status is NO (i.e., the pre-check has failed), the operation proceeds to the update operation 312. The update operation 312 updates a status of the storage device server to a failure status of pre-check. In some aspects, the status updater 212 may update the status on the encryption orchestrator 112 for alerting to repair the storage device servers 124 that have failed the pre-check. In some other aspects, the storage device servers 124 and/or the data storage devices 126A-H with the issue in pre-check may be marked for repair, and pre-check may be performed at a later time when the repair is complete and unmarked for repair (not shown). When the status is YES (i.e., the pre-check has succeeded), the operation proceeds to the active operation 308.

The activate operation 308 activates an encryption of data at rest in the specified storage device sever. In some aspects the activation may include activating data encryption functions as provided by the host operating system of a storage device server that a data storage device or a drive attaches to. In some other aspects, the activation may include activating data encryption functions as provided by hardware-based data encryption in the specified data storage device. Detailed protocols to activate data encryption on the specific storage device servers may depend on host operating systems of the storage device servers and types of the specified data storage devices. The activation operation 308 may look up methods that are specific to the host operating systems and the specified data storage devices in activating encryption of data. In some aspects, the activate operation 308 may include resetting and restarting the specified storage device server and the data storage devices. In some other aspects, when the specified data storage device fails to restart itself during the activate operation 308, data may be lost. The encryption orchestrator 114 may evacuate data from the specified storage device server or the data storage device before performing the activate operation 308 to enable data recovery in case of the failure in the specified storage device server or the data storage device.

The check operation 310 may check a status (health check) of the specified storage device server and/or the data storage device after activating the specified storage device server. In some aspects, checking of the status may include one-time verification of parameters that are associated with the specified storage device server and the data storage devices. Such parameters may include, but are not limited to, an network address of the data storage device or a disk drive, a path name, a history of hardware and software issues at the data storage device, integrity of encryption and decryption keys, a security certificate of the specified data storage devices (e.g., for locking and unlocking data storage devices), connectivity between the encryption controller 116 (particularly the key manager 120) and the storage device server 124, data transmission speed and latency over the network in accessing the specified data storage devices, and integrity of settings of access privileges, etc. The parameters may be obtained from devices associated with the specified storage device server, the data storage devices that attach to the specified storage device sever, a key manager (e.g., key managers 120A-B), and a privilege manager (e.g., privilege managers 122A-B). In some other aspects, the storage device health monitor 210 may check the parameters periodically or as triggered by events such as data access or idle timeouts in accessing the specified storage device server and the data storage device. The storage device health monitor 210 may cause alerts and notifications through a graphical user interface tool about a status in the encryption orchestrator 114.

The update operation 312 updates a status of the specified storage device server and the data storage device based on the result of processing the request for activating encryption of data at rest in the specified storage device server. For example, the update operation 312 may update a status by indicating the encryption of data in the specified storage device server has been successfully activated. The status may include a result of the health check on the specified storage device server that is actively accessed and used to write and read data. In some aspects, the status may be provided through an encryption orchestrator tool, which may feature a graphical user interface.

The compare operation 313 compares whether there are more storage device servers to encrypt. When there are more storage servers to encrypt (i.e., YES), the step returns to the receive operation 304. When there are no more storage device servers to encrypt (i.e., NO), the step proceeds to the End 314.

As should be appreciated, operations 302-314 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4A:
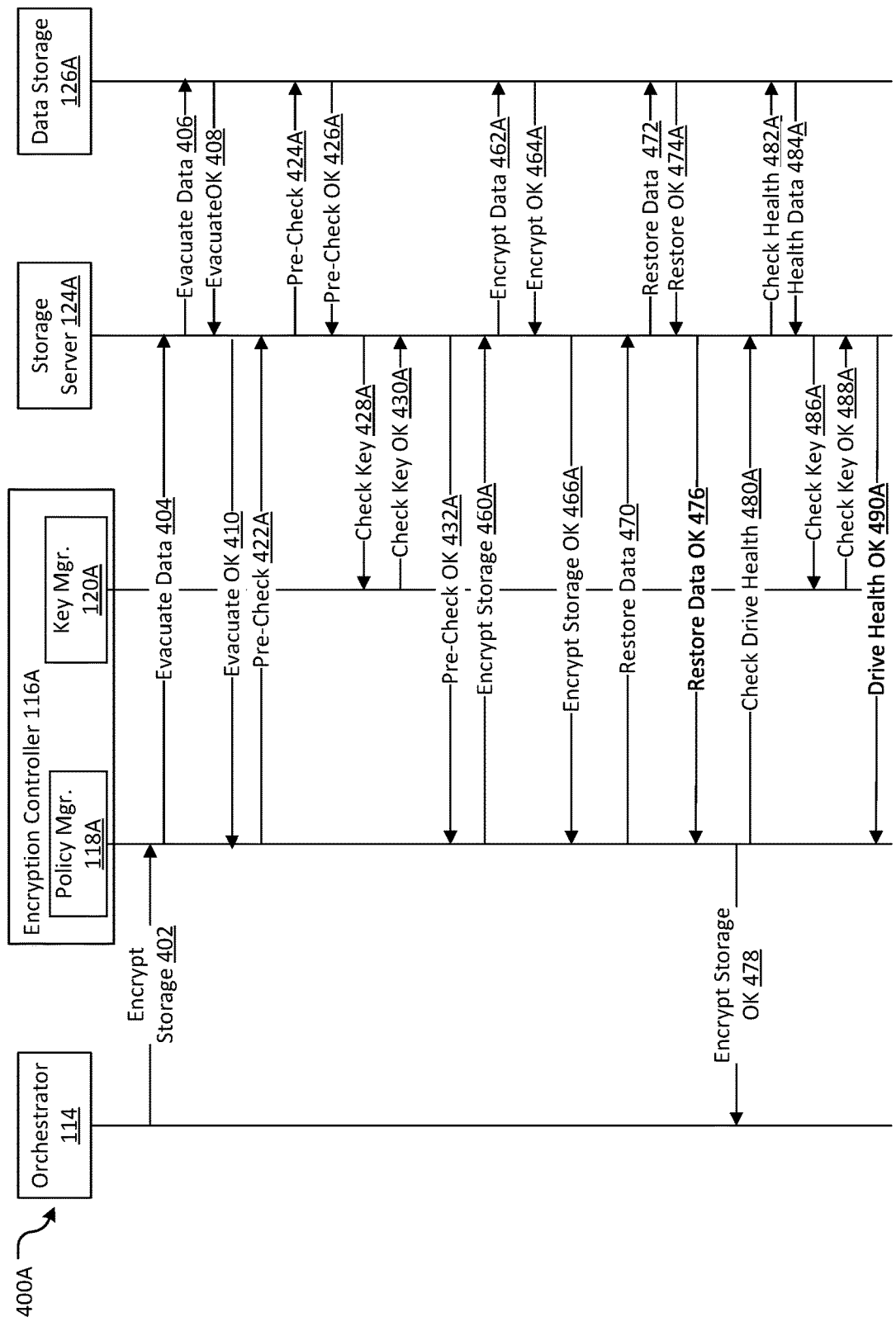
FIGS. 4A-4C illustrate exemplary timing charts for activating encryption of data at rest according to an example system of the present disclosure.
Figure 4B:
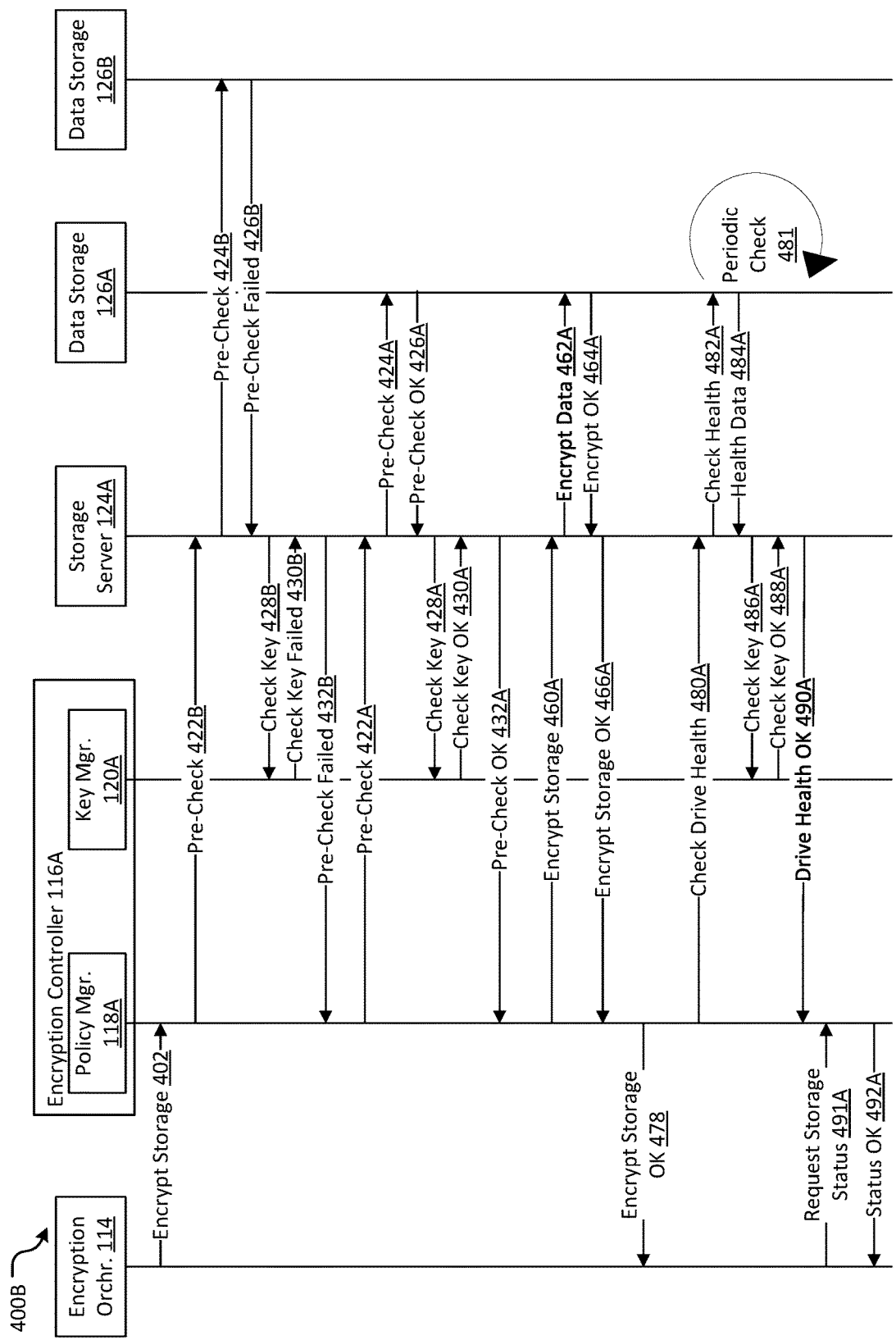
Figure 4C:
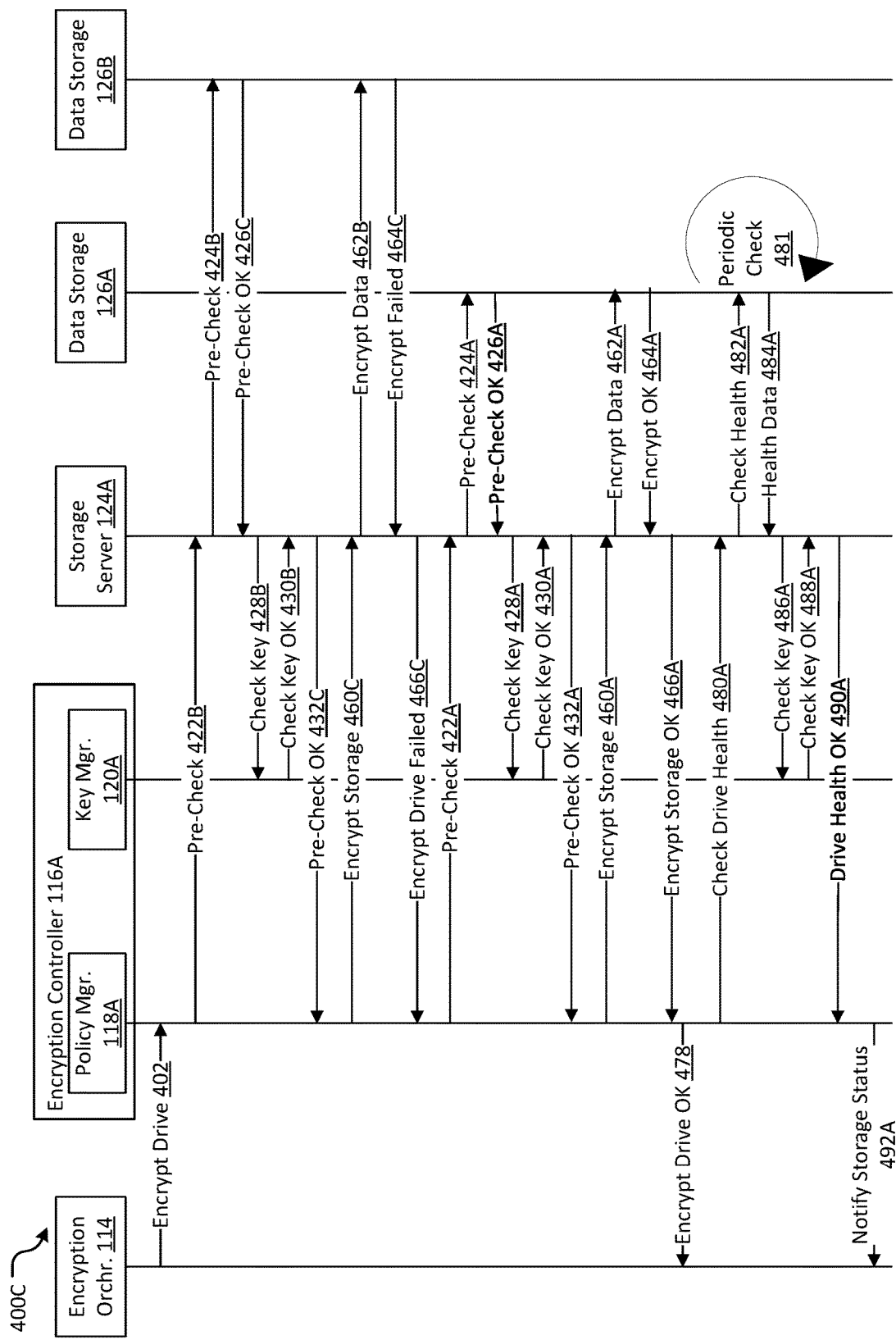

FIGS. 4A-4C illustrate exemplary time charts for activating encryption of data at rest according to an example system of the present disclosure. The timing chart 400A in FIG. 4A illustrates a timing of communications and processing operations among components of the cloud storage system 110 for activating encryption in a data storage device. The encryption controller 116A includes the policy manager 118A and the key manager 120A.

In the encrypt operation 402, the encryption orchestrator 114 transmits a command to the policy manager 118A in the encryption controller 116A to implement a policy or a workflow to activate encryption in a specific data storage device (e.g., a data storage device 126A). The policy manager 118A then sends a command 404 to the storage device server 124A to evacuate data from the data storage device 126A. The evacuation of the data to another data storage devices enables recovery of data in case encryption activation fails and data becomes unrecoverable. The storage device server 124A sends a command 406 to the data storage device 126A to evacuate data. The data storage device 126A may move data from the data storage device 126A to another data storage device (not shown) such that data would not be lost in case the data storage device 126A fails to activate encryption and loses all the data stored in the data storage device 126A. In some aspects, the data storage device 126A may copy the data to another data storage device thereby allowing customers to continue accessing data while the data storage device 126A undergoes encryption activation without interruption. The data storage device 126A then transmits "Evacuate OK" (Success) status 408 to the storage device server 124A. The storage device server 124A then sends the status 410 of successful completion of the evacuate command to the policy manager 118A.

Next, the policy manager 118A sends a pre-check command 422A to the storage device server 124A. The key manager 120A may look up the keys for the data storage device 126A, and send a command 426A with the keys to the storage device server 124A. The storage device server 124A sends a command 424A to the data storage device 126A to pre-check the data storage device 126A. The data storage device 126A may perform the pre-check by reading and validating parameters including, but not limited to, a network address of the data storage device 126A, encryption and decryption keys, and a security certificate. The data storage device 126A then sends a status (Pre-check OK) 426A to the storage device server 124A. The storage device server 124A then sends a command 428A to the key manager 120 to check integrity of encryption and decryption keys for the storage device server 124A and the data storage device 126A. The key manager checks the integrity of the keys and sends a command 430A to send the OK status to the storage device server 124A. In some aspects, the storage device server 124A receives the encryption and decryption keys from the key manager 120A to perform the integrity check. Additionally or alternatively, the storage device server 124A performs the pre-check by reading the status parameters from the data storage device 126A and determining whether the status parameters are normal. The storage device server 124A may then send a pre-check OK status 432A to the policy manager 118A.

Next, the policy manager 118A sends the storage device server 124A a command 460A to activate encryption of data at rest in the data storage device 126A. The storage device server 124A sends a command 462A through the host operating system to the data storage device 126A to activate encryption of data in the data storage device 126A. Upon successful completion of the activation, the data storage device 126A sends a status "Encryption OK" 464A to the storage device server 124A. In some aspects, the data storage device 126A may undergo a power-cycle where the data storage device 126A turns its power off and then restarts itself. The data storage device 126A may determine a successful status encryption activation after restarting the data storage device 126A. In some other aspects, the data storage device 126A completes activation of encryption without restarting itself. The data storage device 126A sends a status "Encrypt OK" 464A to the storage device server 124A. The storage device server 124A sends the success status of encryption activation (466A) to the policy manager 118A. The policy manager 118A then sends a command 470 to the storage device server 124A to restore data based on the data that was evacuated before the activation. The storage device server 124A sends a command 472 to the data storage device 126A to restore data. In some aspects the data storage device 126A restores data by copying the data that has been evacuated as a result of the evacuate data command 406. Upon completion of restoring data, the data storage device 126A sends a status 474A to the storage device server 124A. The storage device server 124A then sends a status 476 of successful completion of data restoration to the policy manager 118A. The policy manager 118A sends an encrypt storage OK command 478 to the encryption orchestrator 114.

After successful completion of encryption activation, the policy manager 118A may send a command 480A to check drive health (e.g., a health check) to the storage device server 124A. In some aspects, the storage device server 124A may check status data of the data storage device 126A after the data storage device 126A has restored the evacuated data to the data storage device 126A. In some other aspects, the storage device server 124A sends a command 482A to the data storage device 126A to check health status of the data storage device 126A. The data storage device 126A may send to the storage device server 124A a status 484A of whether the data storage device 126A experiences anomalies in processing input and output of data. Additionally or alternatively, the storage device server 124A sends a check key command 486A to the key manager 120A to check integrity of the encryption and decryption keys for the encryption of data at rest at the storage server 124A and the data storage device 126A. The key manager 120A performs the integrity check of the keys and sends check key OK status 488A as a response to the storage server 124A. In some aspects, the storage server 124A may receive the keys from the key manager 120A to perform the integrity check of the keys at the storage device server 124A. The storage device server 124A then sends a status 490A of the health check to the policy manager 118A.

As should be appreciated, operations 402-490A are described for purposes of illustrating the present methods and systems and are not intended to limit the disclosure to a particular sequence of operations, e.g., operations may be performed in differing order, additional operations may be performed, and disclosed operations may be excluded without departing from the present disclosure.

The timing chart 400B in FIG. 4B illustrates a timing of operations of communications and processing among components of the cloud storage system 110 for activating encryption of data at rest in a data storage device. In particular, the timing chart 400B depicts encryption activation when there is a problem identified during the pre-check.

Like FIG. 4A, at operation 402 the encryption orchestrator 114 transmits a command to the policy manager 118A to execute a policy or a workflow to activate encryption of data at rest in a specific data storage device (e.g., a data storage device 126B). In some aspects, the policy manger 118A may send a command (not shown in FIG. 4B) to the storage device server 124A to evacuate data from the data storage device 126B. The storage device server 124A sends a command 406 to the data storage device 126B to evacuate data. The data storage device 126B may move data from the data storage device 126B to another data storage device (not shown in FIG. 4B) such that data would not be lost in case the data storage device 126B fails to activate encryption and loses all the data stored in the data storage device 126B.

The policy manager 118A then sends a pre-check command 422B to the storage device server 124A by specifying the data storage device 126B as the target device to pre-check. Additionally or alternatively the storage device server 124A may identify and determine the target device based on the receipt of the pre-check command 422B. The storage device server 124A sends a command 424B to the data storage device 126B to pre-check the data storage device 126B. The data storage device 126B may perform the pre-check operation by reading and validating parameters including, but not limited to, a network address of the data storage device 126B, encryption and decryption keys, and a security certificate. Here, the data storage device 126B detects that the pre-check fails because of an issue found in use of the data storage device 126B. Examples of the types of problems that might cause a pre-check to fail include, but not limited to an error in connectivity between the storage device server 124A and the key manager 120A in the encryption controller 116A, an error in integrity of the encryption and decryption keys that are managed by the key manager 120A or locally by the storage device server 124A, an error in connectivity between the storage device server 124A and the data storage device 126B, an error in network addresses for the encryption controller 116A and the storage device server 124A, and an error in integrity of the data storage device 126B. The data storage device 126B then sends a status (Pre-check Failed) 426B to the storage device server 124A. Additionally or alternatively, the storage device server 124A may perform the pre-check by reading the status parameters from the data storage device 126B and determine whether the status parameters are normal. In this example, the pre-check of the data storage device 126B fails. The storage device server 124A may then send a status 432B of the pre-check failure to the policy manager 118A.

In some aspects, the policy manager 118A may send an error completion status of the Encrypt Storage command to the encryption orchestrator to deny the request to activate encryption because of an error in the data storage device 126B. (The operation is not shown in FIG. 4B.) Additionally or alternatively, the policy manager 118A sends a pre-check command 422A to the storage device server 124A by specifying the data storage device 126A as a replacement because the data storage device 126B failed. The storage device server 124A sends a command 424A to the data storage device 126A to pre-check the data storage device 126A. The data storage device 126A may perform the pre-check by reading and validating parameters including, without limitation, a network address of the data storage device 126A, encryption and decryption keys, and a security certificate. The data storage device 126A then sends a status (Pre-check OK) 426A to the storage device server 124A. The storage device server 124A then sends a command 428A to the key manager 120 to check integrity of encryption and decryption keys for the storage device server 124A and the data storage device 126A. The key manager checks the integrity of the keys and sends a command 430A to send the OK status to the storage device server 124A. In some aspects, the storage device server 124A may receive the encryption and decryption keys from the key manager 120A to perform the integrity check. Additionally or alternatively, the storage device server 124A may perform the pre-check by reading the status parameters from the data storage device 126A and determine whether the status parameters are normal. The storage device server 124A may then send a pre-check OK status 432A to the policy manager 118A.

The policy manager 118A may then send the storage device server 124A a command 460A to activate encryption of data at rest in the data storage device 126A. The storage device server 124A may then a command 462A to the data storage device 126A to activate encryption of data at rest in the data storage device 126A. Upon successful completion of the activation, the data storage device 126A may send a status "Encrypt OK" 464A to the storage device server 124A. In some aspects, the data storage device 126A undergoes a power-cycle where the data storage device 126A may turn its power off and then restart itself. The data storage device 126A may determine a successful status encryption activation after restarting the data storage device 126A. In some other aspects, the data storage device 126A may complete encryption activation without restarting itself. The data storage device 126A then sends a status "Encrypt OK" 464A to the storage device server 124A. The storage device server 124A sends the success status 466A of encryption activation to the policy manager 118A. Upon receiving the status 466A on completing the encryption of data at rest in the data storage device 126A, the policy manager 118A sends a completion status 478 of the encryption activation operation to the encryption orchestrator 114.

In some aspects, after the success activation of encryption of data at rest, the policy manager 118A may then send a command (not shown in FIG. 4B) to the storage device server 124A to restore data based on the data that was evacuated before the activation. The storage device server 124A sends a command (not shown in FIG. 4B) to the data storage device 126A to restore data.

In aspects, after the successful completion encryption activation in the storage device server 124A, the policy manager 118A sends the storage device server 124A a command 480A to check drive health (health check). In some aspects, the storage device server 124A then reads a health data of the data storage device 126A as the data storage device 126A is actively available online to input and output data to customers. In some other aspects, the storage device server 124A sends a command 482A to the data storage device 126A to check health status of the data storage device 126A. The data storage device 126A may send the storage device server 124A a status 484A of whether the data storage device 126A experiences anomalies in processing input and out of data. Additionally or alternatively, the storage device server 124A sends a check key command 486A to the key manager 120A to check integrity of the encryption and decryption keys for the encryption of data at rest at the storage server 124A and the data storage device 126A. The key manager 120A performs the integrity check of the keys and sends check key OK status 488A as a response to the storage server 124A. In some aspects, the storage server 124A may receive the keys from the key manager 120A to perform the integrity check of the keys at the storage device server 124A. The storage device server 124A then sends a status 490A of the health check to the policy manager 118A. In some aspects, the policy manager 118A periodically 481 transmit a command 480A to the storage device server 124A to perform a health-check on the storage device server 124A and the data storage device 126A while the data storage device is active and online, processing inputs and outputs of data. The period may be predetermined by the policy manager 118A, for example. Additionally or alternatively, the period may be determined by the storage device server 124A and/or the data storage device 126A based on parameters such as processing load and time since the last error or anomaly was found. While not shown, the storage device server 124A and/or the data storage device 126A may send the status information to the key manager 120A when the status information relates to key management. In some aspects, the encryption orchestrator 114 may request for a storage encryption status 491A to the encryption controller 116A, particularly the policy manager 118A, for example. The policy manager 118A may notify the encryption orchestrator 114 a status 492A of the storage device 426A based on the health check operation, which indicates no anomalies found with the health check on the storage device server 124A. If so, the encryption orchestrator 114 displays the normal status through a graphical user interface. Additionally or alternatively, the encryption orchestrator 114 provides the status to the user via messaging.

As should be appreciated, operations 402-492A in FIG. 4B are described for purposes of illustrating the present methods and systems and are not intended to limit the disclosure to a particular sequence of operations, e.g., operations may be performed in differing order, additional operations may be performed, and disclosed operations may be excluded without departing from the present disclosure.

The timing chart 400C in FIG. 4C illustrates a timing communications and processing operations among components of the cloud storage system 110 of encryption activation in a data storage device. In particular, the timing chart 400C depicts a data storage device that experiences an issue with the encryption activation process despite the fact that it passed the pre-check process.

At operation 402, the encryption orchestrator 114 transmits a command to the policy manager 118A to execute a policy or a workflow to activate encryption of data at rest in a specific data storage device (e.g., a data storage device 126B). The policy manager 118A then sends a pre-check command 422B to the storage device server 124A. The storage device server 124A sends a command 424B to the data storage device 126B to pre-check the data storage device 126B. The data storage device 126B may perform the pre-check operation by reading and validating parameters including, but not limited to, a network address of the data storage device 126B, encryption and decryption keys, and a security certificate. Here, the data storage device 126B detects that the pre-check passes. The data storage device 126B then sends a status (Pre-check OK) 426C to the storage device server 124A. The storage device server 124A then sends a command 428A to the key manager 120 to check integrity of encryption and decryption keys for the storage device server 124A and the data storage device 126A. The key manager checks the integrity of the keys and sends a command 430A to send the OK status to the storage device server 124A. In some aspects, the storage device server 124A may receive the encryption and decryption keys from the key manager 120A to perform the integrity check. Additionally or alternatively, the storage device server 124A may perform the pre-check by reading the status parameters from the data storage device 126B and determine whether the status parameters are normal. In this example, the pre-check of the data storage device 126B succeeds. The storage device server 124A then sends a status 432C of the successful pre-check to the policy manager 118A.

The policy manager 118A may then send the storage device server 124A a command 460C to activate encryption of data at rest in the data storage device 126B. The storage device server 124A may then issue a command 462B to the data storage device 126B to activate encryption of data at rest in the data storage device 126B. In some aspects, the data storage device 126B finds an error during the activation. The data storage device 126B sends a status 464C of failed activation to the storage device server 124A. In some other aspects, the data storage device 126B may fail to restart itself during the activation and become unable to communicate with the storage device server 124A. The storage devices server 124A may detect the unresponsive data storage device 126B based on time out and determine that the activation has failed in the data storage device 126B after the time out period elapses, for example. The storage device server 124A may then send a status 466C about the failed activation of encryption in the data storage device 126B to the policy manager 118A. In some aspects, the status 466C may include detailed information about the error status. The detailed information may include but not limited to a reboot error of the storage device server 124A, a reboot error (including connectivity time-our) of the data storage device 126B, an error in integration of the encryption and decryption keys (managed locally in the storage device server 124A or remotely in the key manager 120A of the encryption controller 116A), a connectivity error between the encryption controller 116A (including the key manager 120A) and the storage device server 124A, a hardware error in the data storage device 126B, and a network configuration error.

In some aspects, the policy manager 118A notifies the status of the storage device server 124A. The graphical user interface tool in the encryption orchestrator 114 may display the status of the storage device server 124A that is managed by the encryption controller 116A.

In some aspects, the policy manager 118A may include a policy to allocate and pre-check a data storage device 126A as an alternative device when the originally specified data storage device fails the pre-check. In some other aspects, the graphical user interface too may enable the administrator to specify an alternative storage device server or data storage devices to user. The current example includes the policy to use the data storage device 126A as an alternative when the data storage device 126B fails activation. The policy manager 118A then sends a pre-check command 422A to the storage device server 124A by specifying the data storage device 126A as an alternative to the failed data storage device 126B. The storage device server 124A sends a command 424A to the data storage device 126A to pre-check the data storage device 126A. The data storage device 126A may perform the pre-check by reading and validating parameters including, but not limited to, a network address of the data storage device 126A, encryption and decryption keys, and a security certificate. The data storage device 126A then sends a status (Pre-check OK) 426A to the storage device server 124A. The storage device server 124A then sends a command 428A to the key manager 120 to check integrity of encryption and decryption keys for the storage device server 124A and the data storage device 126A. The key manager checks the integrity of the keys and sends a command 430A to send the OK status to the storage device server 124A. In some aspects, the storage device server 124A may receive the encryption and decryption keys from the key manager 120A to perform the integrity check. Additionally or alternatively, the storage device server 124A may perform the pre-check by reading the status parameters from the data storage device 126A and determine whether the status parameters are normal. The storage device server 124A may then send a pre-check OK status 432A to the policy manager 118A.

The policy manager 118A then sends the storage device server 124A a command 460A to activate encryption of data at rest in the data storage device 126A. The storage device server 124A may then issue a command 462A to the data storage device 126A to activate encryption of data at rest in the data storage device 126A. Upon successful completion of the activation, the data storage device 126A sends a status "Encryption OK" 464A to the storage device server 124A. In some aspects, the data storage device 126A may undergo a power-cycle where the data storage device 126A may turn its power off and then restart itself. The data storage device 126A may determine a successful status of encryption activation after restarting the data storage device 126A. In some other aspects, the data storage device 126A completes encryption activation without restarting itself. The data storage device 126A then sends a status "Encrypt OK" 464A to the storage device server 124A. The storage device server 124A sends the success status 466A of encryption activation to the policy manager 118A. Upon receiving the status 466A on completing the encryption of data at rest in the data storage device 126A, the policy manager 118A sends a completion status 478 of the encryption request to the encryption orchestrator 114.

After successful completion of activating encryption of data at rest, the policy manager 118A may send the storage device server 124A a command 480A to check drive health (health check). In some aspects, the storage device server 124A then reads a health data of the data storage device 126A as the data storage device 126A is actively available online to input and output data to customers. In some other aspects, the storage device server 124A sends a command 482A to the data storage device 126A to check health status of the data storage device 126A. Additionally or alternatively, the storage device server 124A sends a check key command 486A to the key manager 120A to check integrity of the encryption and decryption keys for the encryption of data at rest at the storage server 124A and the data storage device 126A. The key manager 120A performs the integrity check of the keys and sends check key OK status 488A as a response to the storage server 124A. In some aspects, the storage server 124A may receive the keys from the key manager 120A to perform the integrity check of the keys at the storage device server 124A. The data storage device 126A may send to the storage device server 124A a status 484A of whether the data storage device 126A experiences anomalies in processing input and out of data. The storage device server 124A then sends a status 490A of the health check to the policy manager 118A. While not shown, the storage device server 124A and/or the data storage device 126A may send the status information to the key manager 120A when the status information relates to key management. In some aspects, the policy manager 118A may periodically (481) transmit the command 480A to the storage device server 124A to perform health check of the storage device server 124A and the data storage device 126A while the data storage device is active and online, processing inputs and outputs of data. The period may be predetermined by the policy manager 118A, for example. Additionally or alternatively, the period may be determined by the storage device server 124A and/or the data storage device 126A based on parameters such as processing load and time since the last error or anomaly was found.

The policy manager 118A notifies the encryption orchestrator 114 of a status 498A of the storage device 426A, which indicates no anomalies found through the health check on the storage device 426A. The encryption orchestrator 114 displays the normal status through a graphical user interface. Additionally or alternatively, the encryption orchestrator 114 may provide the status to the user via messaging. While not shown in FIG. 4C, the data storage device 126A may detect anomalies during the health check. In some aspects, the data storage device 126A sends the anomaly information in the health data 488A to the storage device server 124A. The storage device server 124A then sends the anomaly information to the policy manager 118A. The policy manager 118A notifies the encryption orchestrator 114 about the status 498A. The encryption orchestrator 114 may provide the problem found during the health check in a graphical user interface tool. Additionally or alternatively, the encryption orchestrator 114 may transmit the status to the users by messaging.

As should be appreciated, operations 402-492A in FIG. 4C are described for purposes of illustrating the present methods and systems and are not intended to limit the disclosure to a particular sequence of operations, e.g., operations may be performed in differing order, additional operations may be performed, and disclosed operations may be excluded without departing from the present disclosure.

As should be appreciated, the various methods, devices, applications, features, etc., described with respect to FIGS. 4A-4C are not intended to limit example of the processing in the cloud storage system 110. Accordingly, additional topology configurations may be used to practice the methods and systems herein described may be excluded without departing from the methods and systems disclosed herein.

FIG. 5 illustrates a data structure in accordance with the present invention. Entries of information about data storage devices in the cloud storage system 110 in FIG. 5 indicates, for example, encryption controller ID 501, server ID 502, storage device ID 504, certificate 506, key 508, encryption policy 510, and status 512. Different application programs may provide types of operations that differ from these in the example.

Encryption controller ID 501 indicates an identifier of the encryption controller (e.g., 116A-B in FIG. 1). The encryption orchestrator 114 orchestrates a plurality of encryption controllers 116 in the cloud storage system 110. In FIG. 5, the data indicates the Encryption Controller ID of "ABC." Server ID 502 indicates identifiers of storage device servers (e.g., storage device servers 124A-D in FIG. 1) in the cloud storage system 110. Storage device ID 504 indicates identifiers of data storage devices (e.g., data storage devices 126A-H in FIG. 1), which are connected to respective storage device servers. The data structure associates a data storage device with a storage device server. Certificate 506 lists security certificate that may authenticate the data storage device. The certificate may be for locking and unlocking data storage devices 126, for example. Key 508 indicates a key for encryption and/or decryption of data stored in the data storage devices 126, for example. In some aspects, keys may be managed locally in respective storage device servers 124 and/or data storage devices 126. The value "LOCAL" in the key 508 indicates that the keys for the particular storage data servers 124 are managed locally by the storage data servers 124. Encryption policy 510 indicates a type of policies for encryption of data at rest in the respective data storage devices. For example, a data storage device may feature data encryption based on a data encryption feature of a host operating system (e.g., "Host OS-Type-A") of the storage device server. In other example, a data storage device may feature hardware-based data encryption functionality (e.g., "DISK-HARDWARE") by a digital signal processor in the data storage device. Status 512 indicates a status of respective data storage devices. For example, a value "ENCRYPTED" indicates that the data storage device has activated encryption of data at rest. A value "UNENCRYPTED" indicates that the data storage device stores data without encryption. A value "ACTIVATING . . . " indicates that the data storage device is undergoing the activation operation of encryption of data at rest. A value "ERROR" indicates that the storage device is having an error in storing data.

In some aspects, the cloud storage system 110 may use the data structure to manage Defense in Depth in terms of encryption of data at rest in the cloud storage system 110. Encryption orchestrator 114 may use data from the data structure 500 to provide information about the cloud storage system 110 through a graphical user interface.

As should be appreciated, the types and the structures of data, data fields, etc., described with respect to FIG. 5 are not intended to limit example of the data structures 500. Accordingly, additional types and structures of data and data fields may be used to practice the methods and systems herein and/or components described may be excluded without departing from the methods and systems disclosed herein.

Figure 6A:
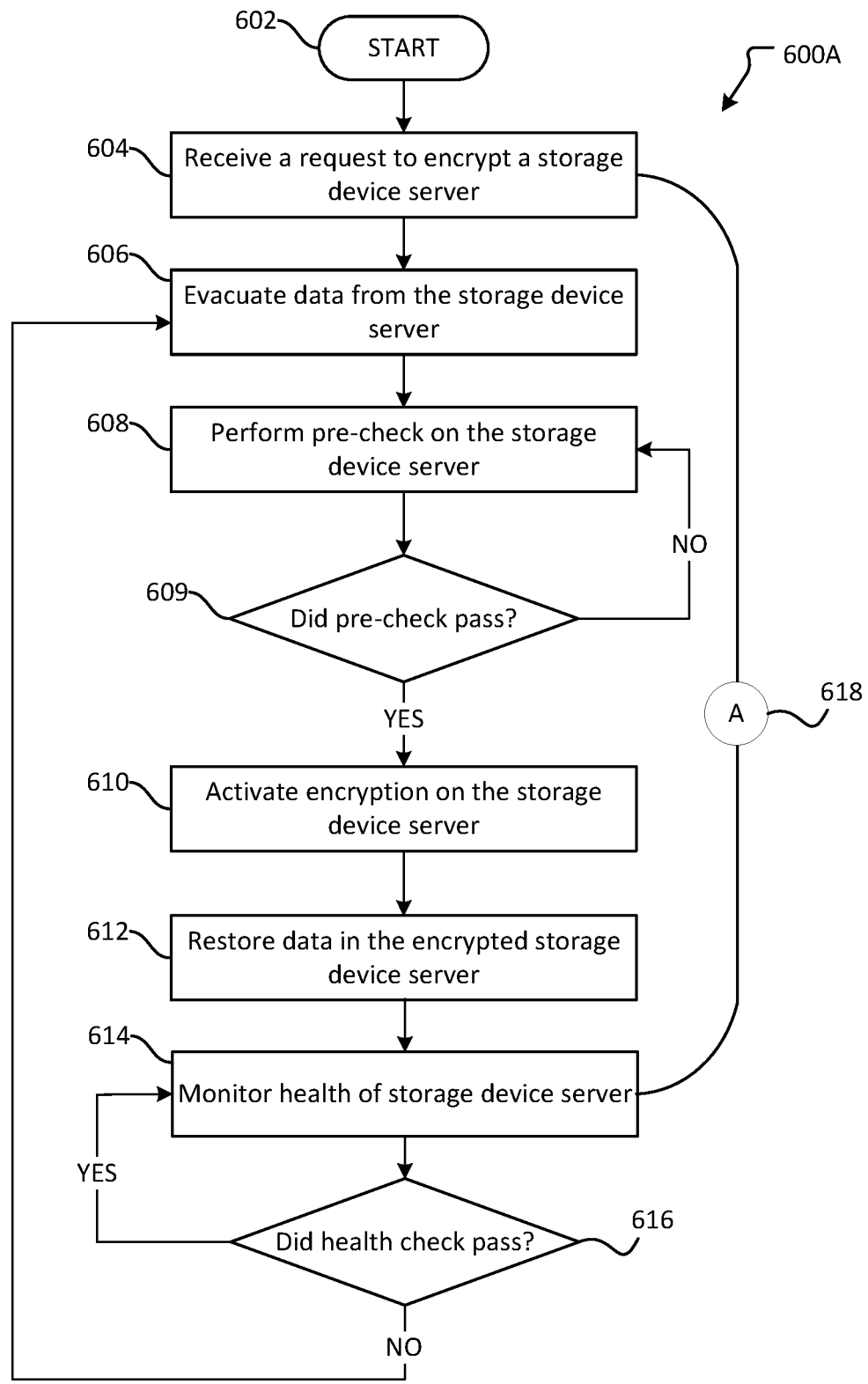
FIGS. 6A-6B illustrate examples of methods of activating encryption of data at rest according to an example system with which the disclosure may be practiced of the present disclosure.
Figure 6B:
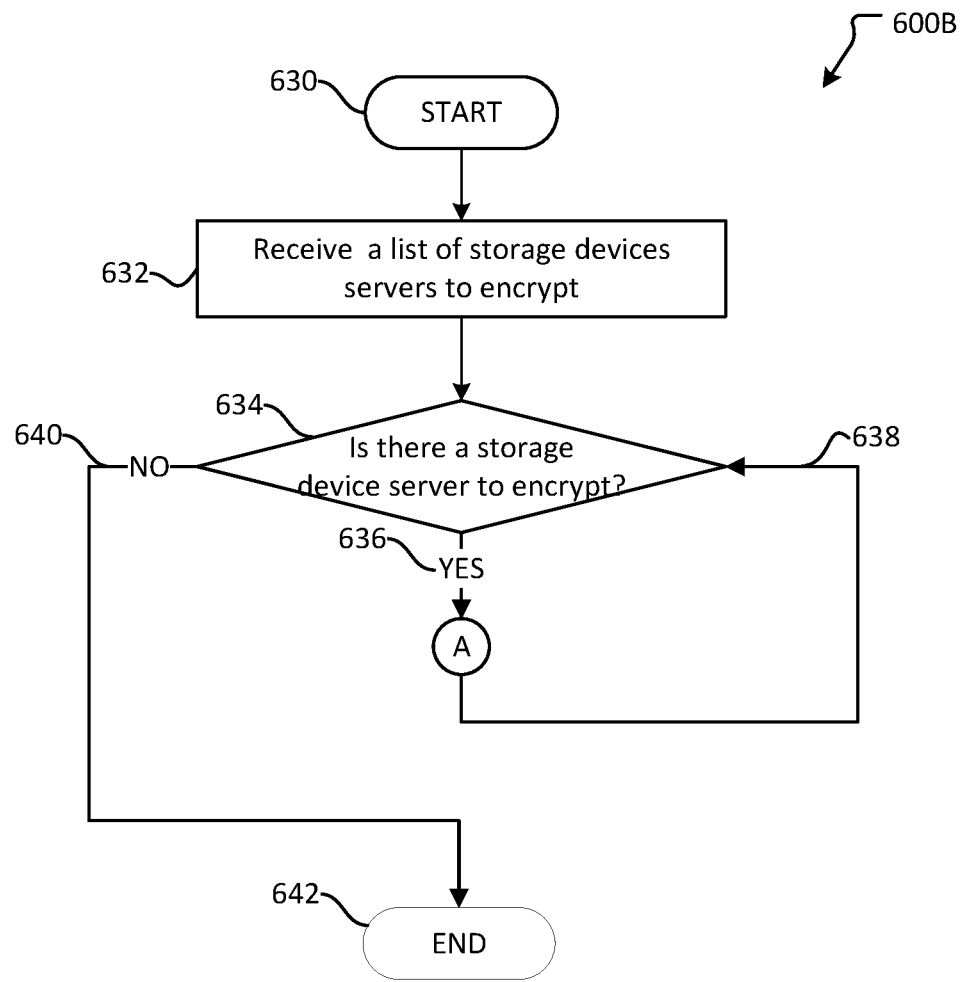

FIGS. 6A-6B illustrates examples of methods of encryption activation in a data storage device according to an example system with which the disclosure may be practiced of the present disclosure.

A general order for the operations of the method 600A is shown in FIG. 6A. Generally, the method 600A starts with a start operation 602 and ends with an end operation 616. The method 600A can include more or fewer stages or can arrange the order of the stages differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, a FPGA, a SOC, or other hardware device. Hereinafter, the method 600A shall be explained with reference to the systems, component, devices, modules, software, data structures, data characteristic representations, signaling diagrams, methods, etc. described in conjunction with FIGS. 1-5 and 7-11.

The receive operation 604 receives, by the encryption controller 116, a request to encrypt a storage device server. In some aspects, the request is for encryption activation in a specific storage device server in the cloud storage system 110. The request may cause activation of data encryption at rest in one or more data storage devices that connect to the specified storage device server. In some other aspects, the request may specify a data storage device that connects to the specified storage device server. The specified data storage device may be one or more of the data storage devices 126A-H in FIG. 1. In some aspects, the data storage device may be a disk drive. In some other aspects, the data storage device may be a virtual data storage device that is a part a physical data storage device or spanning across multiple physical data storage devices.

The evacuate operation 606, by the encryption controller 116, may evacuate data from the data storage device in the specified storage device server. In at least some aspects, the evacuate operation 606 may cause the encryption orchestrator 114 to instruct a storage device server that is connected with the specified data storage device to move existing data from the specified data storage device to another data storage device. Such an evacuation of data may be important to prevent loss of data when the specified storage device server or the data storage device crashes during activation, and data becomes unrecoverable.

The perform operation 608, by the encryption controller 116, may perform a pre-check of the specified data storage device. In some aspects, the pre-check may include requesting configuration data and an operational status of specific data storage devices 126A-H. Types of status data used for the pre-check may include, but are not limited to, connectivity between the storage device server 124A-D and the key manager 120A-B in the encryption controller 116A-B, integrity of the encryption and decryption keys that are managed by the key manager 120A-B or locally by the storage device server 124A-D, connectivity between the storage device server 124A-D and the data storage device 126A-H, network addresses for the encryption controller 116A-B and the storage device server 124A-D, and integrity of the data storage device 126A-H. The storage device pre-checker 206 may obtain the status data by requesting and receiving the data from the respective encryption controllers 116 and storage device servers 124. Pre-checking data storage devices before encryption activation in the data storage devices reduces possibilities of failing activations of encryption of data at rest in a subsequent operation. In some aspects, the pre-check is effective at preventing loss of data as a failure of encryption activation may cause unrecoverable loss of data.

The compare operation 609 compares whether the pre-check operation is successful (i.e., pass, YES). When the pre-check operation is not successful (i.e., not pass. NO), the operation moves to the perform operation 608. In some other aspects, the encryption controller 116 may transmit an error status for the request to encryption to the encryption orchestrator 114. When the pre-check operation is successful (i.e., pass, YES), the operation proceeds to the activate operation 610.

The activate operation 610 may activate encryption of data at rest in the specified storage device server. In some aspects, activating the specified storage device server may include encrypting some or all of existing data that is stored in the data storage device. The key manager (e.g., 120A-B) may send the specified storage device server (e.g., 124A-B) keys for use in encrypting and decrypting data in the storage device server. In some other aspects, the activation operation may require the specified storage device server to restart itself. There may be a situation where the specified data storage device may fail during the restart process. In such a situation, the encryption controller 116 may specify another data storage device in the specified storage device server or in another storage device server as an alternative and activate the alternative data storage device.

The restore operation 612 may restore data in the specific storage device server. In some aspects, the restore operation 612 takes place after confirming that the specified storage device server is active in encryption of data at rest and a status of the specified storage device server is normal. The restore operation 612 may restore data that has been evacuated before activating the encryption to resume access by the users.

The monitor operation 614 may monitor a health status, which is a status of the specified storage device server after the encryption at rest in the specified storage device server becomes active. In some aspects, monitoring of the health status may include one-time verification of parameters that are associated with the specified storage device server and the data storage device. Such parameters may include, but are not limited to, an network address of the data storage device or a disk drive, a path name, a history of hardware and software issues at the data storage device, encryption and decryption keys, a security certificate of the specified data storage devices (e.g., for use in locking and unlocking the data storage device), integrity of settings of access privileges, connectivity between the storage device server 124A-D and the key manager 120A-B in the encryption controller 116A-B, integrity of the encryption and decryption keys that are managed by the key manager 120A-B or locally by the storage device server 124A-D, connectivity between the storage device server 124A-D and the data storage device 126A-H, network addresses for the encryption controller 116A-B and the storage device server 124A-D, and integrity of the data storage device 126. Some of the parameters may be obtained from the data storage devices associated with the specified storage device server, the specified storage device server, a key manager (e.g., key managers 120A-B), and a privilege manager (e.g., privilege managers 122A-B). In some other aspects, the monitor operation 614 may include the encryption controller 116 requesting a health-check periodically or as triggered by various events, data access or idle timeouts in accessing the data storage device, for example. In some aspects, the monitor operation 614 may cause generating and transmitting alerts and notifications based on a result of the monitor operation by the encryption controller 116 to the encryption orchestrator 114. The encryption orchestrator 114 may provide the status information through a graphical user interface and other interactive tools and logs.

The compare operation 616 compares whether the health check is successful (e.g., pass, YES). When the health check is not successful (e.g., YES), the operation proceeds to the monitor operation 614 to continue periodic health checks. When the health check is not successful (e.g., NO), the operation may proceed to the evacuation operation 606.

The series of operations 602-616 enables the encryption orchestrator 114 to cause the encryption controller 116 to activate a storage device server that stores unencrypted data to encrypt data at rest in a reliable manner by evacuating the existing data from the storage device server, pre-checking the storage device server before encryption activation, activating the storage device server and the data storage device for encryption of data at rest, restoring the data to make the data storage device available for access again, and then monitoring health of the activated storage device server and the data storage device. Typically, pre-checking and periodic health-check of a storage device server may take less time than activating the storage device server for encryption of data at rest and then encountering a failure during the activation or upon reboot of the storage device server after activation. As should be appreciated, operations 602-616 are described for purposes of illustrating the present methods and systems and are not intended to limit the disclosure to a particular sequence of operations, e.g., operations may be performed in differing order, additional operations may be performed, and disclosed operations may be excluded without departing from the present disclosure. The series of operations 604-616 is represented by (A) 618 as referenced by FIG. 6B.

A general order for the stages of the method 600B is shown in FIG. 6B. Generally, the method 600B starts with a start operation 630 and ends with an end operation 642. The method 600B can include more or fewer stages or can arrange the order of the stages differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, a FPGA, a SOC, or other hardware device. Hereinafter, the method 600B shall be explained with reference to the systems, component, devices, modules, software, data structures, data characteristic representations, signaling diagrams, methods, etc. described in conjunction with FIGS. 1-6A and 7-11.

The method 600B illustrates steps of automatic and reliable encryption activation on a set of storage device servers and data storage devices as specified by a list of storage device servers and storage data devices in a batch basis. In some aspects, the method 600B includes the set of operations 604-614 for encryption activation in storage device servers and data storage devices, as represented by (A) in FIG. 6A. The receive operation 632 receives, by the encryption controller 116, a list of storage device servers (e.g., storage device servers 124A-D) and data storage devices (e.g., one or more of data storage devices 126A-H in FIG. 1) for encryption activation. For example, the list may include one or more storage device server IDs and data storage device IDs. The compare operation 634 compares whether there is any data storage device to activate encryption remaining on the list. If there is a data storage device to activate (636), the set of operations (A) is executed for the data storage device. In some aspects, the set of operations (A) includes operations 604-616 in FIG. 6A. After executing the set of operations (A), the flow of operations returns to the compare operation 634 to determine whether the list still includes any storage device server to activate. When there is no more storage device server (and data storage devices) to activate (640), the flow of operations goes to END 642. In some aspects, the method 600B automatically activates encryption of data at rest in a plurality of storage device servers and data storage devices in an iterative manner. In some aspects, the method 600B may automatically allocate and activate an alternative storage device server and/or an alternative data storage device when the storage device server (or the data storage device) that is initially designated for the activation fails its pre-check before the activation, during the activation, or monitored health-check after the activation. The automated, reliable activation of encryption of data at rest in respective storage device servers and data storage devices is critically important in the cloud storage system environment where there are tens of thousands of data storage devices and hundreds of storage device servers being managed in groups by the encryption controllers 116 and then centrally managed by encryption orchestrator 114.

The set of operations as shown in FIG. 6B enables the cloud storage system 110 to automate encryption activation in a set of storage device servers and data storage devices in a reliable manner. In some aspects, the cloud storage system 110 may include a set of thousands of storage device servers and data storage devices (e.g., data drives) that store data unencrypted. Needs may arise for the cloud storage system 110 to migrate all the storage device servers and the data storage devices to provide encryption of data at rest to achieve the Defense in Depth cybersecurity. Since activating each of storage device servers for encryption of data at rest may be time consuming and prone to fail upon rebooting the storage device servers, the batch operations to activate a set of storage device servers and data storage devices need to be reliable and efficient. By evacuating existing data, pre-checking the respective storage device servers before activating them, and performing periodic health checks upon the activated storage device servers, the operation may reduce the risk of encountering a failure of storage device servers and data storage device during the activation. Additionally or alternatively, the operations may include automated steps to select and switch a target storage device servers and data storage devices from the originally targeted and failed storage device servers and data storage devices to other storage device servers and data storage devices upon encountering errors while processing activation requests. Through the automated steps, the activation operation of storage device servers and data storage devices in the cloud storage system can be executed reliably and efficiently.

As should be appreciated, operations 630-642 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
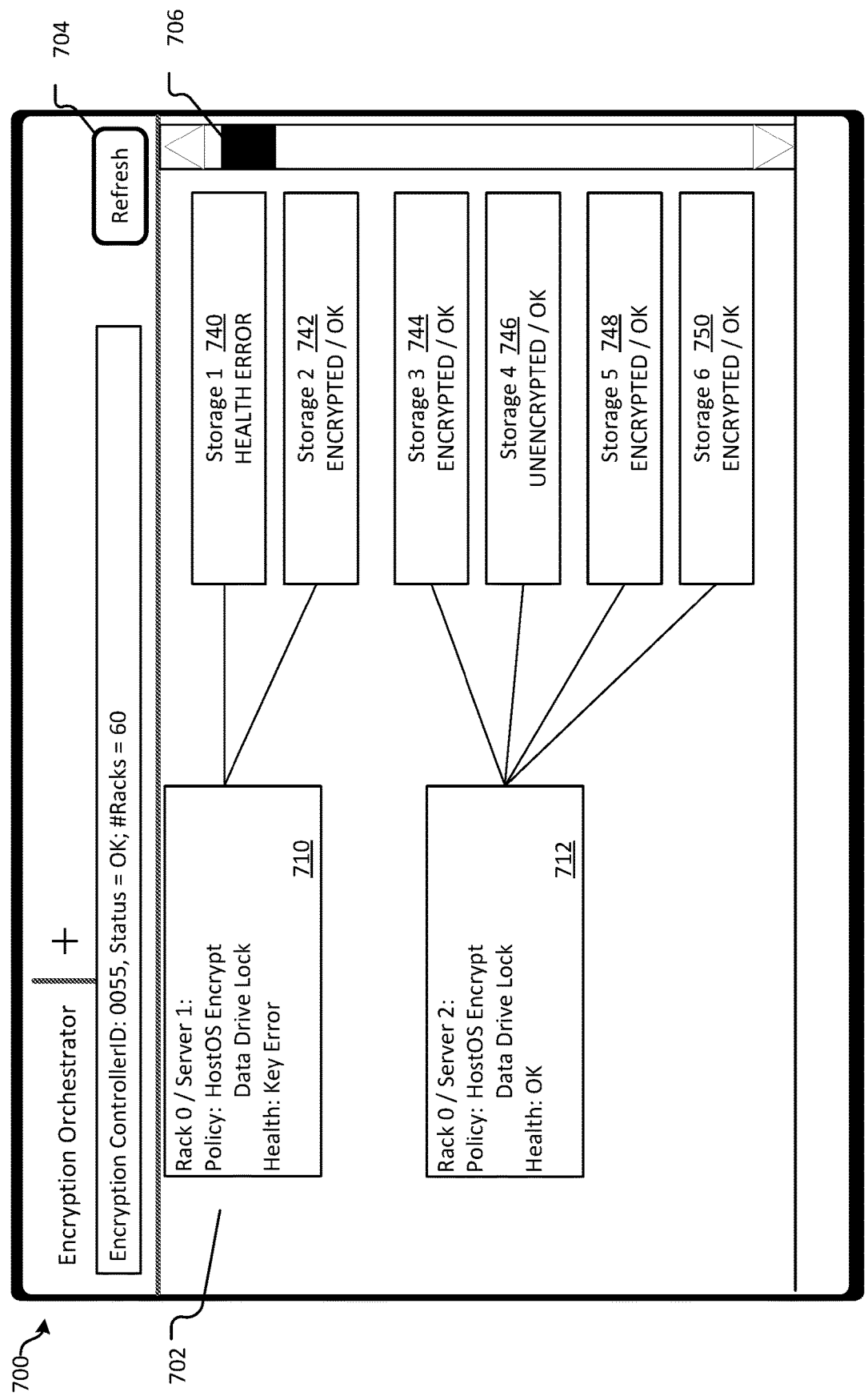
FIG. 7 illustrates an example of a user interface providing structure, settings, and status of servers and storage devices and acting upon the storage devices for encryption of data at rest according to an example system with which the disclosure may be practiced of the present disclosure.

FIG. 7 illustrates an example of a user interface in accordance with the present invention. In some aspects, the user interface is a graphical user interface that interactively displays a structure of servers and devices under a select encryption controller 116 of the cloud storage system 110.

In some aspects, the Encryption Orchestrator tool window in FIG. 7 may provide the graphical user interface 700 displaying a hierarchical structures of storage device servers and corresponding data storage devices under an encryption controller 116. The area 702 includes, as an example, a rendering of relationships among storage device servers and data storage devices. For example, the area 702 shows two of multiple storage device servers, Rack 0/Server 1 (710) and Rack 0/Server 2 (712) as managed by the encryption controller with ID "0055" in the cloud storage system 110. Within respective boxes for the servers indicate information and status about respective servers. For example, Rack 0/Server 1 has a policy of HostOS-based data encryption and the data drive is locked. The health check status of the storage device server shows an error with a classification of "Key Error" where there is a problem of key integrity between the key manager 120 and the storage device server 124, for example. Two data storage devices, storage device 1 (740) and storage device 2 (742), connect to the Rack 0/Server 1 (710). Four data storage devices, storage 3 (744), storage 4 (746), storage 5 (748) and storage 6 (750) connect to the Rack 0/Server 2 (712). The Rack 0/Server 2 (712) has a policy of data encryption based on host OS with data drive locked. The health-check status of the storage device server shows OK. Content of the area 702 may be scrolled to display more servers and data storage devices under the encryption controller. For example the area 702 is vertically by moving the scrolling button 706 vertically. While not shown, the content of the area 702 may be scrollable horizontally by a horizontal scroll button.

Content of the area 702 of the graphical user interface 700 may be updated by the user selecting the Refresh button 704. When the Refresh button is interactively selected, the encryption orchestrator 114 may transmit a command, the request storage status command 491A for example, to the policy manager 118A of the encryption controller 116A to receive status information about one or more of storage device servers 124 and data storage devices 126 controlled by the encryption controller 116A. In response, the policy manager 118A sends the status information (492A, for example) to the encryption orchestrator 114 for updating the information in the area 702. In some aspects, the area 702 may provide a visual representation of actions where one or more of storage device servers 124 and data storage devices 126 are iteratively activated by updating the status information.

In some aspects, each indication of storage device servers and data storage devices indicate a status of the respective storage device servers and data storage devices. For example, the storage 1 (740), one of the data storage devices attached to the Rack 0/Server 1 (a storage device server) is currently showing an error status of a health-check. For example, such an error indication may be provided as a result of the encryption orchestrator 114 receiving a status notification 492A in FIG. 4B when the status notification includes an error in the data storage device based on the health check. The storage 2 (742) enforces encryption of data at rest, as indicated by "ENCRYPTED."

As should be appreciated, the structure of the cloud storage system 110 as rendered in the area 702 in FIG. 7 is described for purposes of illustrating the graphical user interface 700 of the present methods and systems and are not intended to limit the disclosure to a particular sequence of steps, e.g., steps may be performed in differing order, additional steps may be performed, and disclosed steps may be excluded without departing from the present disclosure.

As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g., server devices, network appliances, other client devices, etc.).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
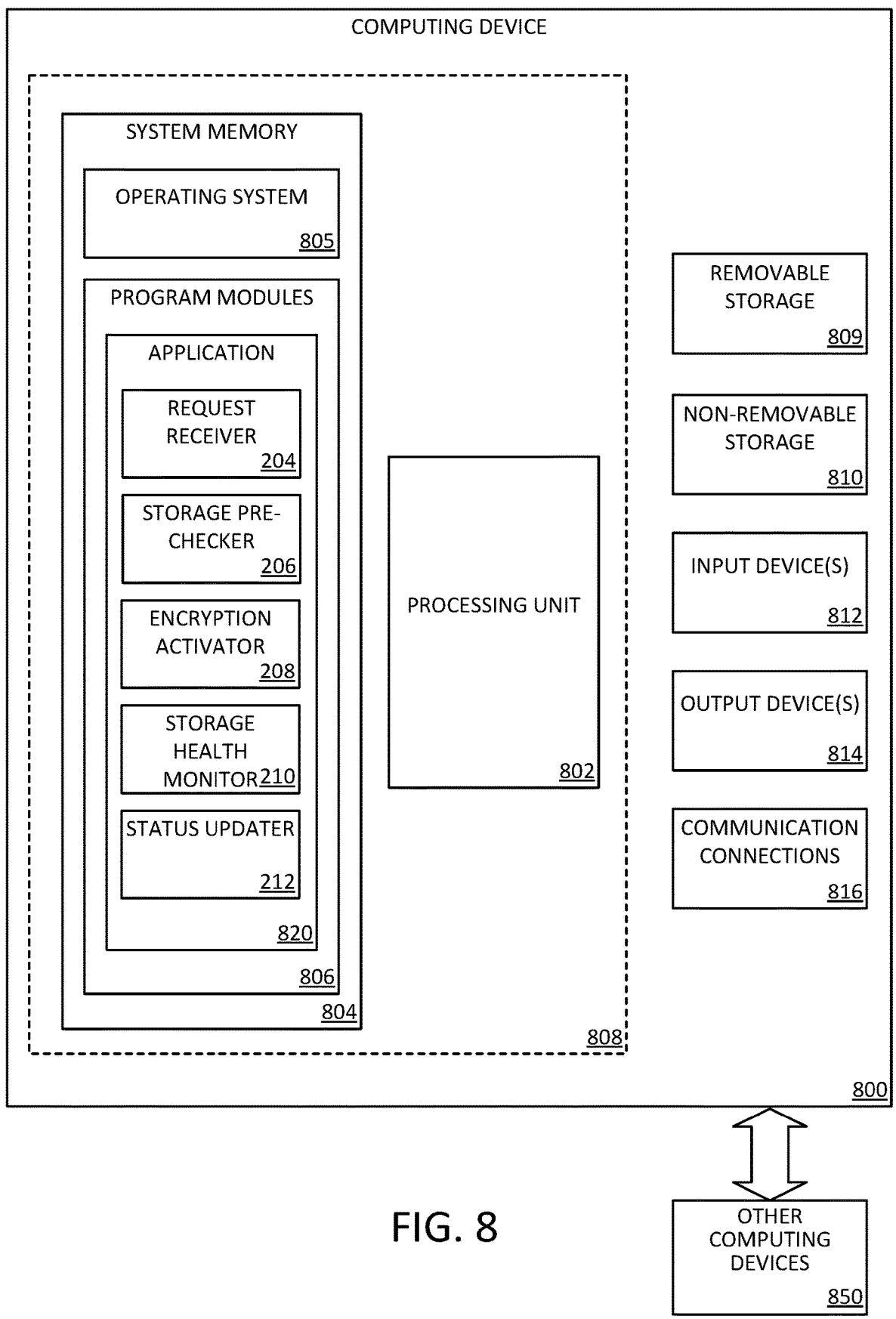
FIG. 8 is a block diagram illustrating example physical components of a computing device with which aspects of the disclosure may be practiced of the present disclosure.

FIG. 8 is a block diagram illustrating physical components (e.g., hardware) of a computing device 800 with which aspects of the disclosure may be practiced. The computing device components described below may be suitable for the computing devices described above, including the client computing devices 104A-B and the encryption orchestrator 114, encryption controllers 116A-B, and storage device servers 124A-D. In a basic configuration, the computing device 800 may include at least one processing unit 802 and a system memory 804. Depending on the configuration and type of computing device, the system memory 804 may comprise, but is not limited to, volatile storage device (e.g., random access memory), non-volatile storage device (e.g., read-only memory), flash memory, or any combination of such memories. The system memory 804 may include an operating system 805 and one or more program modules 806 suitable for performing the various aspects disclosed herein such as a request receiver 204, a storage device pre-checker 206, a (storage device) encryption activator 208, a storage device health monitor 210, and a status updater 212. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage device is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but are not limited to, the aspects, as described herein. Other program modules that may be used of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but are not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The terms computer readable media as used herein may include computer storage device media and computer storage medium. Computer storage device media and computer storage medium may include volatile and nonvolatile, removable and non-removable media implemented in any method or technology for storage device of information, such as computer readable instructions, data structures, or program modules. The system memory 804, the removable storage device 809, and the non-removable storage device 810 are all computer storage device media examples (e.g., memory storage device). Computer storage device media may include RAM, ROM, electrically erasable read-only memory (EEPROM), flash memory or other memory technology, CD-ROM, digital versatile disks (DVD) or other optical storage device, magnetic cassettes, magnetic tape, magnetic disk storage device or other magnetic storage devices, or any other article of manufacture which can be used to store information and which can be accessed by the computing device 800. Any such computer storage device media may be part of the computing device 800. Computer storage device media does not include a carrier wave or other propagated or modulated data signal. Furthermore, computer storage medium does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
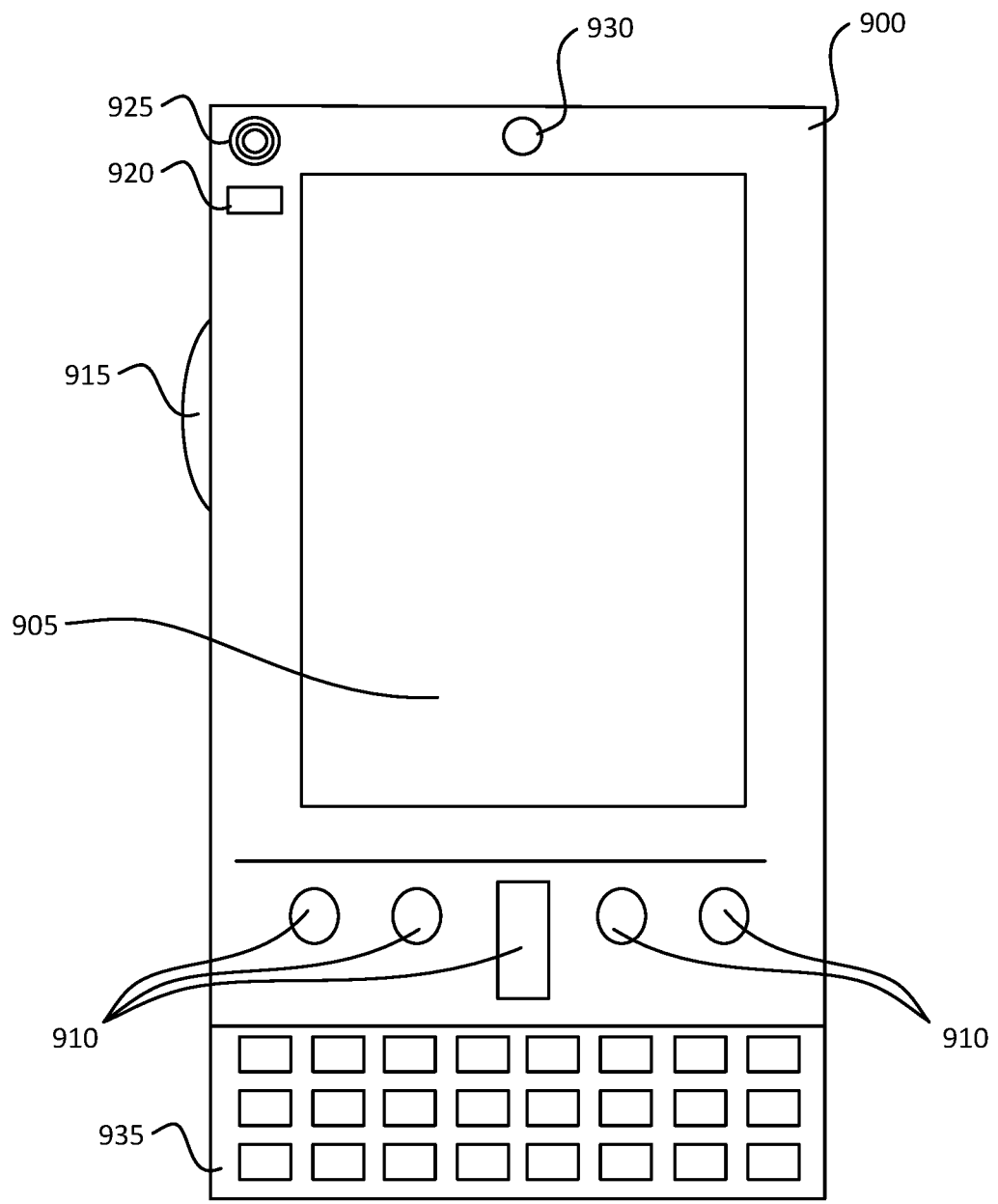
FIGS. 9A and 9B are simplified block diagrams of a mobile computing device with which aspects of the present disclosure may be practiced of the present disclosure.
Figure 9B:
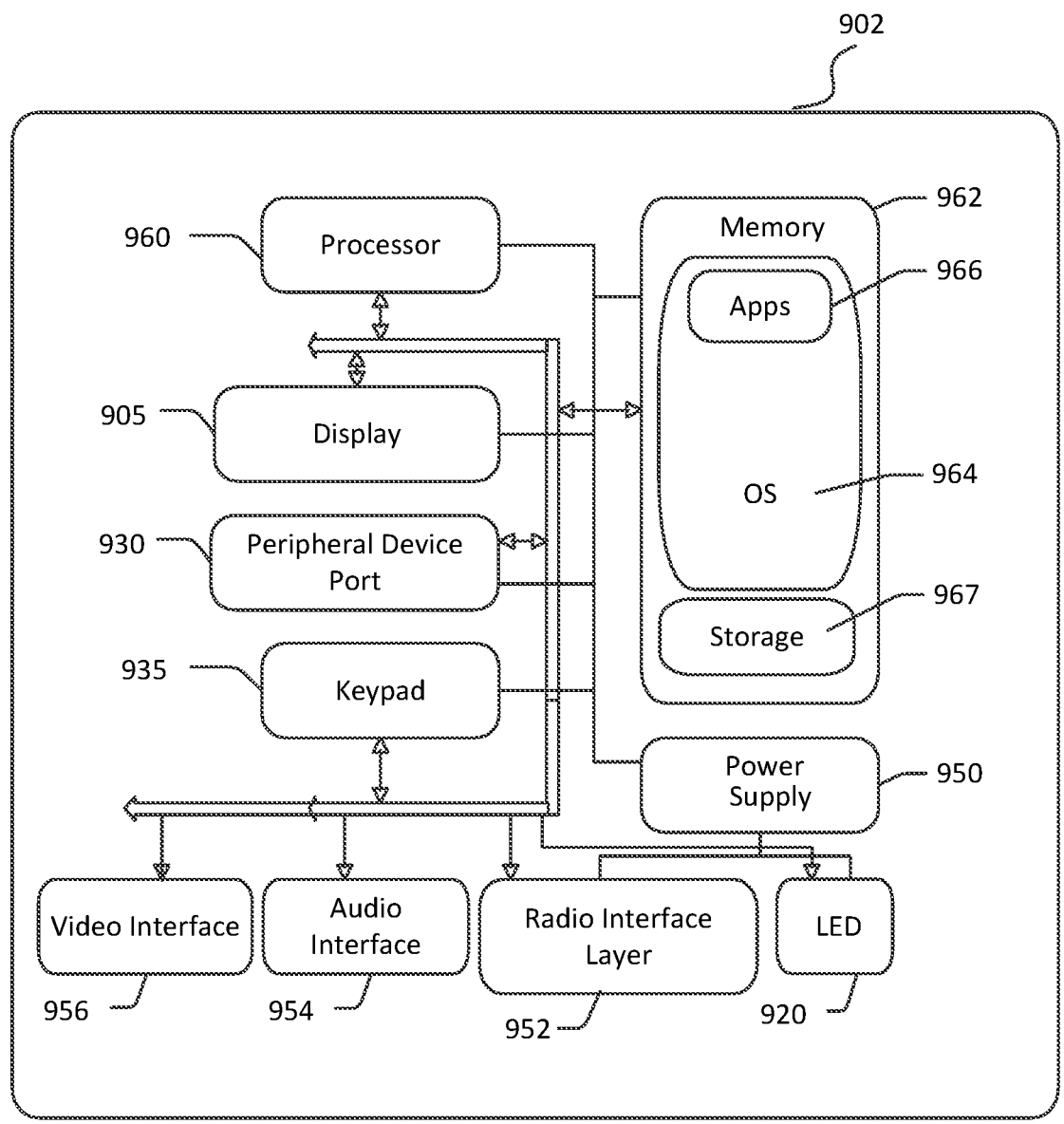

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In at least some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In at least some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In at least some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage device area 968 within the memory 962. The non-volatile storage device area 967 may be used to store persistent information that should not be lost if the system 902 is powered down. The application programs 966 may use and store information in the non-volatile storage device area 967, such as e-mail or other messages used by an e-mail application, and the like. A synchronization application (not shown) also resides on the system 902 and is programmed to interact with a corresponding synchronization application resident on a host computer to keep the information stored in the non-volatile storage device area 967 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 950, which may be implemented as one or more batteries. The power supply 950 might further include an external power source, such as an AC adapter or a powered docking cradle that supplements or recharges the batteries.

The system 902 may also include a radio interface layer 952 that performs the function of transmitting and receiving radio frequency communications. The radio interface layer 952 facilitates wireless connectivity between the system 902 and the "outside world," via a communications carrier or service provider. Transmissions to and from the radio interface layer 952 are conducted under control of the operating system 964. In other words, communications received by the radio interface layer 952 may be disseminated to the application programs 966 via the operating system 964, and vice versa.

The visual indicator 920 may be used to provide visual notifications, and/or an audio interface 954 may be used for producing audible notifications via the audio transducer 925. In the illustrated embodiment, the visual indicator 920 is a light emitting diode (LED) and the audio transducer 925 is a speaker. These devices may be directly coupled to the power supply 950 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 954 is used to provide audible signals to and receive audible signals from the user. For example, in addition to being coupled to the audio transducer 925, the audio interface 954 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 956 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage device is illustrated in FIG. 9B by the non-volatile storage device area 967.

Data/information generated or captured by the mobile computing device 900 and stored via the system 902 may be stored locally on the mobile computing device 900, as described above, or the data may be stored on any number of storage device media that may be accessed by the device via the radio interface layer 952 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 952 or via a distributed computing network. Similarly, such data/information may be readily transferred between computing devices for storage device and use according to well-known data/information transfer and storage device means, including electronic mail and collaborative data/information sharing systems.

Figure 10:
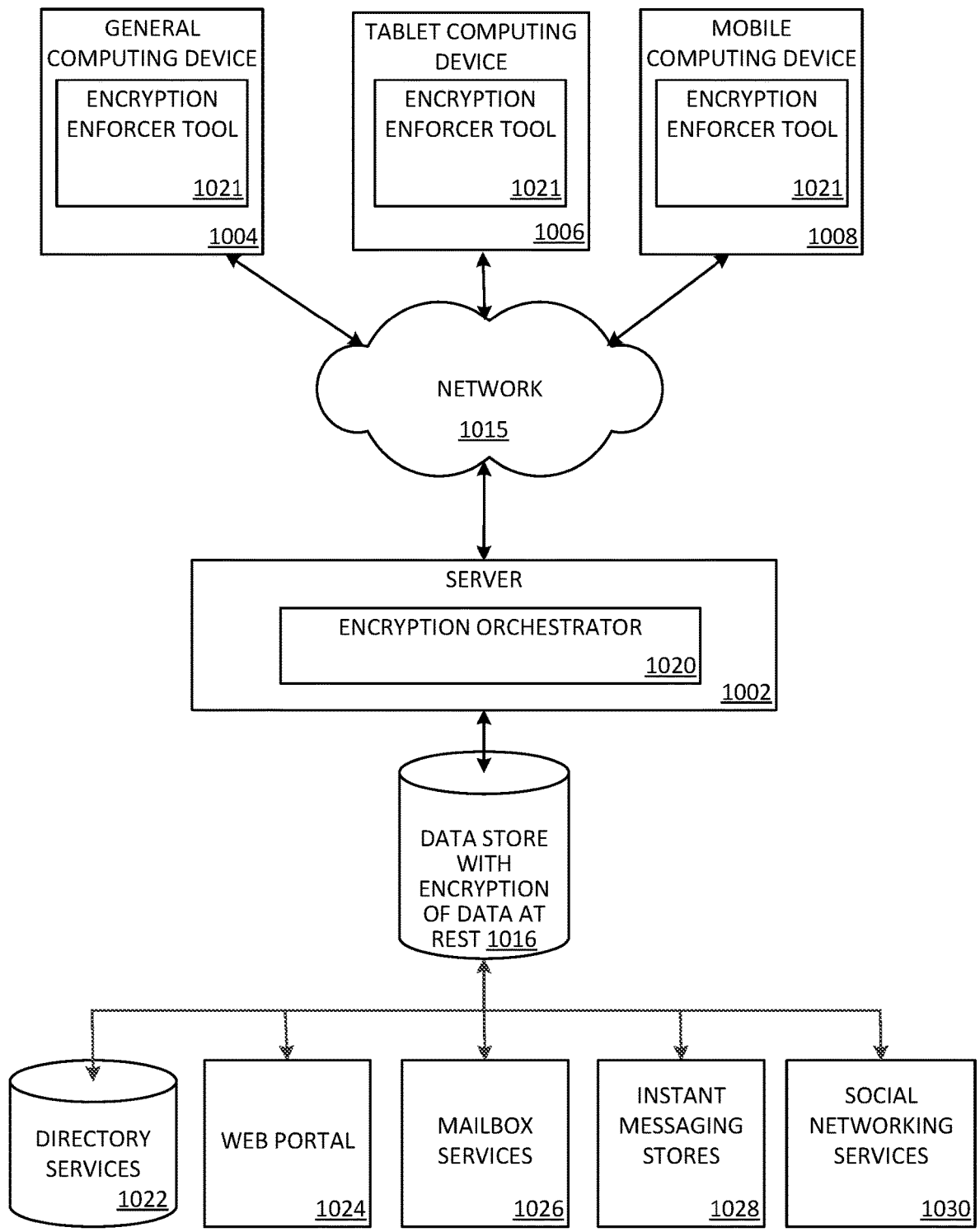
FIG. 10 is a simplified block diagram of a distributed computing system in which aspects of the present disclosure may be practiced of the present disclosure.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage device types. For example, various documents may be stored using a directory service 1022, a web portal 1024, a mailbox service 1026, an instant messaging store 1028, or a social networking site 1030. An encryption enforcer tool 1021 may be employed by a client that communicates with server device 1002, and/or usage classification component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the data store with encryption of data at rest 1016, in addition to receiving graphical data useable to be either pre-processed at a graphic-originating system, or post-processed at a receiving computing system. In some aspects, the server 1002, the data store with encryption of data at rest 2016, the directory services, the web portal 1024, the mailbox services 1026, the instant message stores 1028, and the social networking services 1030 may constitute a cloud storage system.

Figure 11:
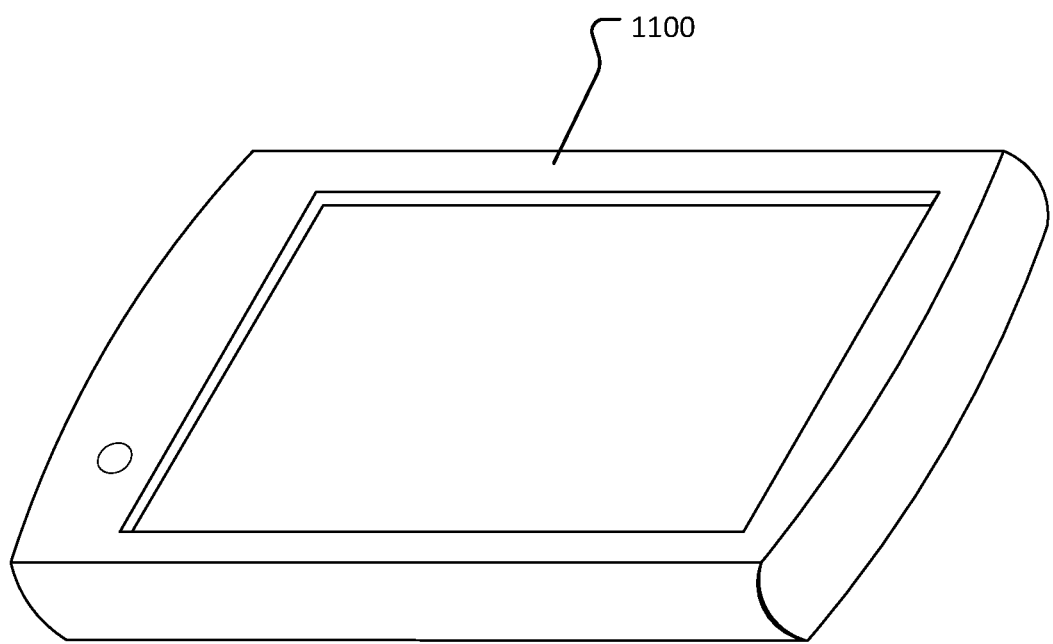
FIG. 11 illustrates a tablet computing device for executing one or more aspects of the present disclosure of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage device and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

An aspect herein can include a computer-implemented method for activating encryption in a data storage device. The method comprises receiving a request to activate encryption of a storage device server, wherein the storage device server comprises a data storage device, performing a pre-check of the storage device server; encrypting data stored in the storage device server when the pre-check of the storage device server is successful, monitoring an operating status of the storage device server when the data stored in the data storage device has been encrypted, and periodically providing the operating status of the storage device server.

In another aspect, the pre-check includes verifying a server configuration of the storage device server, the server configuration including an encryption key and a decryption key for the storage device server.

In another aspect, the operating status of the storage device server comprises one or more of a network address of the data storage device, a status of connectivity between the storage device server and a key server, a security certificate of the data storage device, and an access privilege of the data storage device.

In another aspect, the method also comprises sending a status failure notification when the pre-check fails and denying the request to activate encryption of the storage device server.

In another aspect, encrypting data stored in the storage device server further comprises encryption by a host operating system of the storage device server, wherein the data storage device being attached to the storage device server.

In another aspect, encrypting data stored in the data storage device is performed by a data encryption processor embedded in the data storage device.

In another aspect, the method further comprises identifying an alternative data storage device when the performance of the pre-check of the data storage device results in an error, performing a pre-check of the alternative data storage device; encrypting data stored in the alternative data storage device when the pre-check of the alternative data storage device is successful, monitoring an operating status of the alternative data storage device when the data stored in the alternative data storage device has been encrypted, and periodically providing the operating status of the alternative data storage device.

In another aspect, the method further comprises evacuating data from the data storage device to the alternative data storage device, encrypting the evacuated data on the alternative data storage device, and restoring the encrypted evacuated data back to the data storage device.

In another aspect, the method further comprises receiving a list of a plurality of storage device servers in a cloud storage system, and iteratively activating encryption in the plurality of storage device servers.

In another aspect, providing the operating status of the storage device server comprises generating a visual representation of the plurality of storage device servers and data storage devices in the cloud storage system, the visual representation of the plurality of storage device servers and data storage devices comprising: a storage device server; and one or more data storage devices attached to the storage device server, wherein the one or more data storage devices include the data storage device, updating a visual representation of the operating status of the data storage device, and generating a visual representation of a set of iterative actions, the iterative actions including encrypting data at rest in at least one of the one or more data storage devices.

In another aspect, the method is performed by an encryption controller.

In another aspect, the method is performed by an encryption orchestrator.

Another aspect herein can include a cloud storage system comprising a storage device server with at least one data storage device, an encryption orchestrator, and an encryption controller. The encryption orchestrator comprises a processor; and a memory storing computer-executable instructions, which, when executed, cause the processor to provide a graphical representation of the storage device server with at least one data storage device, and interactively receive a command to activate encryption of data in the data storage device. The encryption controller comprises a processor, and a memory storing computer-executable instructions, which when executed, cause the processor to receive a request to activate encryption of the data storage device, perform a pre-check of the data storage device; encrypt data stored in the data storage device when the pre-check of the data storage device is successful, monitor an operating status of the data storage device when the data stored in the data storage device has been encrypted, and periodically provide the operating status of the data storage device to the encryption orchestrator.

In another aspect, the encryption controller further comprises a key manager, wherein the key manager stores encryption keys for encryption of data at rest on the at least one storage device server, and a policy manager, wherein the policy manager provides a set of policies in encryption activation on the at least one storage device server.

In another aspect, the encryption controller further comprises computer-executable instructions, which when executed, cause the processor to evacuate data from the data storage device when the pre-check fails.

In another aspect, the encryption controller further comprises computer-executable instructions, which when executed, cause the processor to receive a list of a plurality of data storage devices, and iteratively activate encryption in the plurality of data storage device.

In another aspect, the encryption orchestrator further comprises computer-executable instructions, which when executed, cause the processor to generate a visual representation of a plurality of devices in a cloud storage system, update a visual representation of the operating status of the data storage device, and generate a visual representation of a set of interactive actions, the iterative actions including encrypting data at rest in at least one of the one or more data storage devices. The visual representation of the plurality of devices comprises a storage device server and one or more data storage devices attached to the storage device server. The one or more data storage devices include the data storage device.

Another aspect herein can include a computer storage medium storing computer-executable instructions for encryption activation of a plurality of data storage devices, the instructions when executed by a processor, cause the processor to receive a first request to activate encryption of data at rest in a first server, wherein the first server comprises the plurality of data storage devices, perform a first pre-check of the first server, encrypt data stored in the first server when the first pre-check is successful, monitor an operating status of the plurality of data storage devices connected to the first server when the data stored in the first server has been encrypted, and periodically provide the operating status of the first server and the plurality of data storage devices connected to the first server.

In another aspect, the computer storage medium further comprises computer-executable instructions, which when executed the processor, cause the processor to receive a second request to activate encryption of data at rest in a second server, wherein the second server comprises the plurality of data storage devices, perform a second pre-check of the second server, wherein the second pre-check validates at least one decryption key for data decryption in the second server, and send an error message when the second pre-check is not successful.

In another aspect, the computer storage medium further comprises computer-executable instructions, which when executed the processor, cause the processor to identify an alternative data storage device when the second pre-check of the second server results in an error.

What is claimed is:

1. A computer-implemented method for activating encryption in a storage device server, the computer-implemented method comprising:
    receiving a request to activate the encryption of the storage device server, wherein the storage device server includes a data storage device;
    processing a pre-check of the storage device server, including testing prerequisites for a successful activation of data encryption at rest upon the storage device server;
    encrypting data stored in the storage device server when the pre-check of the storage device server is successful;
    monitoring an operating status of the storage device server when the data stored in the data storage device has been encrypted; and
    periodically providing the operating status of the storage device server.

2. The computer-implemented method of claim 1, wherein the pre-check further comprises reading and validating a server configuration of the storage device server, the server configuration including an encryption key and a decryption key for the storage device server.

3. The computer-implemented method of claim 1, wherein the operating status of the storage device server comprises one or more of:
    a network address of the storage device server,
    a status of connectivity between the storage device server and a key server,
    a security certificate of the storage device server, and
    an access privilege of the storage device server.

4. The computer-implemented method of claim 1, further comprising sending a status failure notification when the pre-check fails and denying the request to activate the encryption of the storage device server.

5. The computer-implemented method of claim 1, wherein encrypting the data stored in the storage device server further comprises encrypting the data based on a host operating system of the storage device server, wherein the data storage device is attached to the storage device server.

6. The computer-implemented method of claim 1, wherein encrypting the data stored in the storage device server is performed by a data encryption processor embedded in the data storage device.

7. The computer-implemented method of claim 1, further comprising:
    identifying an alternative data storage device when the pre-check of the storage device server fails;

processing an alternative pre-check of the alternative data storage device;
encrypting the data stored in the alternative data storage device when the alternative pre-check of the alternative data storage device is successful;
monitoring operations of the alternative data storage device when the data stored in the alternative data storage device has been encrypted; and
periodically providing the status of the alternative data storage device.

8. The computer-implemented method of claim 7, the computer-implemented method further comprising:
evacuating the data from the data storage device; and
based on the alternative pre-check, restoring the data to the alternative data storage device after the encryption of the data stored in the alternative data storage device.

9. The computer-implemented method of claim 1, the computer-implemented method further comprising:
receiving a list of a plurality of the storage device servers in a cloud storage system; and
iteratively activating the encryption in the plurality of the storage device servers.

10. The computer-implemented method of claim 9, wherein providing the operating status of the storage device server further comprises:
generating a visual representation of the plurality of the storage device servers and the plurality of the data storage devices in the cloud storage system;
updating the visual representation of the operating status of the data storage device; and
generating the visual representation of iterative actions, the iterative actions including encrypting the data at rest in at least one of the plurality of the storage device servers.

11. The computer-implemented method of claim 1, wherein the computer-implemented method is performed by an encryption controller.

12. The computer-implemented method of claim 1, wherein the computer-implemented method is performed by an encryption orchestrator.

13. A cloud storage system with a data encryption at rest, the cloud storage system comprising:
a storage device server with at least one data storage device;
an encryption orchestrator comprising:
a first processor; and
a first memory storing a first set of computer-executable instructions, which, when executed, cause the first processor to:
provide a graphical representation of the storage device server with the at least one data storage device; and
transmit a command to activate data encryption in the storage device server; and
an encryption controller comprising:
a second processor; and
a second memory storing a second set of computer-executable instructions, which when executed, cause the second processor to:
receive a request to activate the data encryption in the storage device server;
perform a pre-check of the storage device server, including testing prerequisites for a successful activation of data encryption at rest upon the storage device server;
perform the data encryption in the storage device server when the pre-check of the storage device server is successful;
periodically monitor an operating status of the storage device server when the data encryption in the storage device server is successful; and
periodically provide the operating status of the storage device server to the encryption orchestrator.

14. The cloud storage system of claim 13, wherein the encryption controller further comprises:
a key manager, wherein the key manager comprises encryption keys for the data encryption at rest on the storage device server; and
a policy manager, wherein the policy manager provides a set of policies of the data encryption in the storage device server.

15. The cloud storage system of claim 13, wherein the encryption controller further comprises the second set of computer-executable instructions, which when executed, cause the second processor to:
evacuate data in the storage device server when the pre-check succeeds.

16. The cloud storage system of claim 15, wherein the encryption controller further comprises the second set of the computer-executable instructions, which when executed, cause the second processor to:
receive a list of a plurality of the storage device servers; and
iteratively activate the encryption in the plurality of the storage device servers.

17. The cloud storage system of claim 15, wherein the encryption orchestrator further comprises the first set of the computer-executable instructions, which when executed, cause the first processor to:
generate a first visual representation, wherein the first visual representation further comprises:
the storage device server; and
the at least one data storage device;
provide a second visual representation, wherein the second visual representation comprises the operating status of the at least one data storage device; and
generate a third visual representation, wherein the third visual representation comprises a set of iterative activations of the data encryption at rest in the storage device server.

18. A computer storage medium that stores computer-executable instructions for activation of a data encryption at rest in servers, the computer-executable instructions when executed by a processor, cause the processor to:
receive a first request to activate the data encryption at rest in a first server, wherein the first server comprises a first set of data storage devices;
perform a first pre-check of the first server, including testing prerequisites for a successful activation of data encryption at rest upon the first server;
encrypt the data stored in the first server when the first pre-check is successful;
monitor an operating status of the first server and the first set of the data storage devices connected to the first server when the data stored in the first server has been encrypted; and
periodically provide the operating status of the first server and the first set of the data storage devices.

19. The computer storage medium of claim 18 further comprising the computer-executable instructions, which when executed by the processor, cause the processor to:

receive a second request to activate the data encryption at rest in a second server, wherein the second server comprises a second set of the data storage devices;

perform a second pre-check of the second server and the second set of the data storage devices, wherein the second pre-check comprises validating at least one decryption key for data decryption in the second server; and send an error message when the second pre-check is not successful.

20. The computer storage medium of claim 19, further comprising the computer-executable instructions, which when executed by the processor, cause the processor to:

identify a third server with a third set of the data storage devices when the second pre-check of the second server is an error.

* * * * *